(12) United States Patent
Hiu et al.

(10) Patent No.: US 10,936,561 B2
(45) Date of Patent: Mar. 2, 2021

(54) EXTENSIBLE WELL DATA INTEGRITY SMART DETECTOR

(71) Applicant: Saudi Arabian Oil Company, Dhahran (SA)

(72) Inventors: Martin D. Hiu, Dhahran (SA); Troy W. Thompson, Dhahran (SA); Murtadha I. Habib, Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 226 days.

(21) Appl. No.: 15/950,847

(22) Filed: Apr. 11, 2018

(65) Prior Publication Data

US 2019/0318021 A1 Oct. 17, 2019

(51) Int. Cl.
*G06F 7/00* (2006.01)
*G06F 17/00* (2019.01)
*G06F 16/215* (2019.01)
*G06Q 50/02* (2012.01)
*E21B 49/00* (2006.01)

(52) U.S. Cl.
CPC .......... *G06F 16/215* (2019.01); *E21B 49/003* (2013.01); *G06Q 50/02* (2013.01)

(58) Field of Classification Search
None
See application file for complete search history.

(56) References Cited

U.S. PATENT DOCUMENTS

| | | | |
|---|---|---|---|
| 6,772,068 B2 | 8/2004 | Laake | |
| 7,496,451 B2 | 2/2009 | Fang et al. | |
| 7,739,050 B2 | 6/2010 | Tatro | |
| 8,571,799 B2 | 10/2013 | Suarez-Rivera et al. | |
| 8,665,108 B2 | 3/2014 | Akimov et al. | |
| 8,939,205 B2 | 1/2015 | Ersoz | |
| 9,062,524 B2 | 6/2015 | Calvo et al. | |
| 2013/0338986 A1* | 12/2013 | Nyrnes | G01V 1/36 703/10 |
| 2014/0195454 A1* | 7/2014 | Richie | G06Q 10/0833 705/333 |

(Continued)

FOREIGN PATENT DOCUMENTS

| | | |
|---|---|---|
| CN | 102540256 | 7/2012 |
| WO | 2015006085 | 1/2015 |

OTHER PUBLICATIONS

Abdulelah Bin Mahfoodh et al. "Introducing a Big Data System for Maintaining Well data Quality and Integrity in a World of Heterogeneous Environment", SPE Kingdom of Saudi Arabia Annual Technical Sysposium and Exhibition, Apr. 24, 2017 (Year: 2017).*

(Continued)

*Primary Examiner* — Tuan A Pham
(74) *Attorney, Agent, or Firm* — Fish & Richardson P.C.

(57) ABSTRACT

Well data is retrieved from a connected database for data analysis of well data. One or more Constraints are applied to the retrieved well data to determine if the retrieved well data includes low-quality or incorrect data. Upon determination of the presence of low-quality or incorrect data in the retrieved well data, the determination is reported. The low-quality or incorrect data is analyzed for quality control. The low-quality or incorrect data is remediated based on the quality control analysis.

20 Claims, 30 Drawing Sheets
(2 of 30 Drawing Sheet(s) Filed in Color)

700

702

| | AZIMUTH | ANGLE | MDEPTH | |
|---|---|---|---|---|
| 706 | 0.0 | 0.0 | 0 | |
| 708 | 369.99 | 0.0 | 10500 | 704 |
| 710 | 279.91 | 1.1 | 10513 | |
| | 273.55 | 1.19 | 10526 | |
| | 274.7 | 1.75 | 10552 | |
| | 224.84 | 2.78 | 10647 | |

(56) References Cited

U.S. PATENT DOCUMENTS

| | | | |
|---|---|---|---|
| 2015/0015412 A1* | 1/2015 | Abbassian | E21B 44/00 340/854.4 |
| 2015/0120195 A1* | 4/2015 | Dong | G01V 99/00 702/11 |
| 2015/0185361 A1 | 7/2015 | Al-Nuaim et al. | |
| 2015/0185364 A1* | 7/2015 | Al-Nuaim | G01V 1/003 703/10 |
| 2016/0034517 A1 | 2/2016 | Babai | |

OTHER PUBLICATIONS

International Search Report and Written Opinion issued in International Application No. PCT/US2019/024081 dated Jun. 25, 2019, 18 pages.

Mahfoodh et al., "Introducing a Big Data System for Maintaining Well Data Quality and Integrity in a World of Heterogeneous Environment," SPE Kingdom of Saudi Arabia Annual Technical Symposium and Exhibition, Apr. 24, 2017, 6 pages.

GCC Examination Report in GCC Appln. No. GC 2019-37345, dated May 20, 2020, 4 pages.

* cited by examiner

| EP_A_NUM | WB_EXPL_NAME | MS_DPTH | W_DEV_DR_ANG | W_DEV_TL_AZM | DLS |
|---|---|---|---|---|---|
| 1 | | | | | |
| 2 | | | | | |
| 3 | WELL #1 | 13000 | 2.23 | 294.89 | 0.28 |
| 4 | | 13100 | 1.76 | 301.95 | 0.47 |
| 5 | | 13200 | 1.83 | 300.07 | 0.51 |
| 6 | | 13300 | 2.41 | 283.94 | 0.66 |
| 7 | | 13400 | 2.45 | 275.56 | 0.3 |
| 8 | | 13500 | 2.37 | 268.49 | 0.5 |
| 9 | | 13540 | 2.46 | 272.82 | 0.06 |
| 10 | | 13698 | 2.46 | 272.82 | 0 |
| 11 | | 13700 | 2.46 | 272.82 | -0.02 |
| 12 | | 13303 | 41.31 | 59.08 | 183.61 |
| 13 | | 13324 | 43.62 | 58.7 | 12.85 |
| 14 | WELL #2 | 13342 | 46.56 | 58.52 | 15.53 |
| 15 | | 13361 | 49.92 | 58.18 | 16.02 |
| 16 | | 13382 | 54 | 58.43 | 21.54 |
| 17 | | 13401 | 57.91 | 58.02 | 14.68 |
| 18 | | 13429 | 64.56 | 56.49 | 39.12 |
| 19 | | 13446 | 67.59 | 56.46 | 13.13 |
| 20 | | 13471 | 72.91 | 55.08 | 26.78 |
| 21 | | 13492 | 76.82 | 57.02 | 16.65 |
| 22 | | 13524 | 83.21 | 60.47 | 17.83 |
| 23 | | 13560 | 88.55 | 61.07 | 21.37 |
| 24 | | 13586 | 87.72 | 62.61 | 5.9 |
| 25 | | 13614 | 85.46 | 64.04 | 12.39 |

FIG. 9B

| | EP_A_NUM | WB_EXPL_NAME | MS_DPTH | W_DEV_DR_ANG | W_DEV_TL_AZM | DLS |
|---|---|---|---|---|---|---|
| 1 | | | | | | |
| 2 | | | | | | |
| 3 | | WELL #1 | 4990 | 12.5 | 230 | 53.77 |
| 4 | | WELL #2 | 5740 | 66.174 | 336.923 | 1509.4 |
| 5 | | WELL #3 | 6359 | 88.5 | 45.4 | 114.59 |

| | EP_A_NUM | WB_EXPL_NAME | MS_DPTH | W_DEV_DR_ANG | W_DEV_TL_AZM | DLS |
|---|---|---|---|---|---|---|
| 1 | | | | | | |
| 2 | | | | | | |
| 3 | | WELL #1 | 7185 | 91.2 | 8.5 | 86.2 |
| 4 | | | 7281 | 89.93 | 4.7 | 178.6 |
| 5 | | | 7377 | 90.34 | 359.21 | 434.05 |
| 6 | | | 7185 | 91.2 | 8.5 | 86.2 |
| 7 | | | 7281 | 89.93 | 4.7 | 178.6 |
| 8 | | WELL #2 | 7377 | 90.34 | 359.21 | 434.05 |
| 9 | | | 7463 | 91.41 | 10.23 | 148.55 |
| 10 | | | 7558 | 89.76 | 11.62 | 172.21 |
| 11 | | | 7655 | 88.66 | 12 | 202.99 |
| 12 | | | 7751 | 89.83 | 12.09 | 253.79 |
| 13 | | | 7847 | 90 | 7.05 | 253.78 |
| 14 | | | 7943 | 89.66 | 2.78 | 218.59 |
| 15 | | | 7185 | 91.2 | 8.5 | 86.2 |
| 16 | | | 7281 | 89.93 | 4.7 | 178.6 |
| 17 | | | 7377 | 90.34 | 359.21 | 434.05 |
| 18 | | WELL #3 | 7463 | 91.41 | 10.23 | 148.43 |
| 19 | | | 7558 | 89.76 | 11.62 | 172.21 |
| 20 | | | 7655 | 88.66 | 12 | 202.99 |
| 21 | | | 7751 | 89.83 | 12.09 | 251.79 |

| WELL NAME | MAX DEPTH(DEPTHLOG) | MAX SPLICED DEPTH | MAX DEPTH LOG NAME | EPPR TD |
|---|---|---|---|---|
| WELL #1 | 17416 | 17416 | ROP_ED_DM | 17355 |
| WELL #2 | 26847 | 26847 | ROP_ED_DM | 26748 |

FIG. 10

FIELD: ALL   WELLS: ALL

1400a

| CONSTRAINT | WELL IN VIOLATION | TOTAL WELL | % OF VIOLATION TO TOTAL | SCORE OUT OF 100 | |
|---|---|---|---|---|---|
| 1 | 100 | 1250 | 8 | 92 | DETAILS |
| 2 | 55 | 1250 | 4.4 | 95.6 | DETAILS |
| 3 | 250 | 1250 | 20 | 80 | DETAILS |
| 4 | 200 | 1250 | 16 | 84 | DETAILS |
| 5 | 300 | 1250 | 24 | 76 | DETAILS |
| 6 | 325 | 1250 | 26 | 74 | DETAILS |
| 7 | 200 | 1250 | 16 | 84 | DETAILS |
| 8 | 50 | 1250 | 4 | 96 | DETAILS |
| 9 | 150 | 1250 | 12 | 88 | DETAILS |
| 10 | 49 | 1250 | 3.92 | 96.08 | DETAILS |
| 11 | 285 | 1250 | 22.8 | 77.2 | DETAILS |
| 12 | 210 | 1250 | 16.8 | 83.2 | DETAILS |
| 13 | 66 | 1250 | 5.28 | 94.72 | DETAILS |

MEAN AGGREGATE QUALITY SCORE: 87

FIG. 14A

FIELD: HORDA   WELLS: ALL

| CONSTRAINT | WELL IN VIOLATION | TOTAL WELL | % OF VIOLATION TO TOTAL | SCORE OUT OF 100 | |
|---|---|---|---|---|---|
| 1 | 45 | 260 | 17.30769231 | 82.69230769 | DETAILS |
| 2 | 35 | 260 | 13.46153846 | 86.53846154 | DETAILS |
| 3 | 110 | 260 | 42.30769231 | 57.69230769 | DETAILS |
| 4 | 30 | 260 | 11.53846154 | 88.46153846 | DETAILS |
| 5 | 55 | 260 | 21.15384615 | 78.84153846 | DETAILS |
| 6 | 25 | 260 | 9.615384615 | 90.38461538 | DETAILS |
| 7 | 66 | 260 | 25.38461538 | 74.61538462 | DETAILS |
| 8 | 14 | 260 | 5.384615385 | 94.61538462 | DETAILS |
| 9 | 56 | 260 | 21.53846154 | 78.46153846 | DETAILS |
| 10 | 17 | 260 | 6.538461538 | 93.46153846 | DETAILS |
| 11 | 85 | 260 | 32.69230769 | 67.30769231 | DETAILS |
| 12 | 40 | 260 | 15.38461538 | 84.61538462 | DETAILS |
| 13 | 25 | 260 | 9.615384615 | 90.38461538 | DETAILS |

MEAN AGGREGATE QUALITY SCORE: 83

FIELD: HORDA  WELLS: HORDA_18_0

| CONSTRAINT | WELL IN VIOLATION | TOTAL WELL | % OF VIOLATION TO TOTAL | SCORE OUT OF 100 | |
|---|---|---|---|---|---|
| 1 | 1 | 1 | 100 | 0 | DETAILS |
| 2 | 1 | 1 | 100 | 0 | DETAILS |
| 3 | 1 | 1 | 100 | 0 | DETAILS |
| 4 | 1 | 1 | 100 | 0 | DETAILS |
| 5 | 1 | 1 | 100 | 0 | DETAILS |
| 6 | 1 | 1 | 100 | 0 | DETAILS |
| 7 | 1 | 1 | 100 | 0 | DETAILS |
| 8 | 1 | 1 | 100 | 0 | DETAILS |
| 9 | 0 | 1 | 0 | 100 | DETAILS |
| 10 | 0 | 1 | 0 | 100 | DETAILS |
| 11 | 0 | 1 | 0 | 100 | DETAILS |
| 12 | 0 | 1 | 0 | 100 | DETAILS |
| 13 | 0 | 1 | 0 | 100 | DETAILS |

MEAN AGGREGATE QUALITY SCORE: 39

United States Patent 10,936,561 B2

EXTENSIBLE WELL DATA INTEGRITY SMART DETECTOR

BACKGROUND

Hydrocarbon reservoir characterization activities, such as sub-surface mapping, rely on the accuracy and integrity of foundation data, such as well location, trajectory, and well logs. Process inefficiencies or dangerous drilling conditions can occur when inaccurate sub-surface maps are used to guide the planning or drilling of a well, such as a new well or a directionally-drilled well. While geological structures and lithological character can be worked out using various techniques (for example, well log analysis, well marker pick, or surface gridding), the techniques assume the use of correct foundation data. While, foundation data is typically gathered from archived data associated with previously drilled wells, this is not a guarantee that the data is of high-quality.

SUMMARY

The present disclosure describes proactive validation and cross-checking of foundational well data to ensure data integrity.

In an implementation, well data is retrieved from a connected database for data analysis of well data. One or more Constraints are applied to the retrieved well data to determine if the retrieved well data includes low-quality or incorrect data. Upon determination of the presence of low-quality or incorrect data in the retrieved well data, the determination is reported. The low-quality or incorrect data is analyzed for quality control. The low-quality or incorrect data is remediated based on the quality control analysis.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, the described approach is based on cross-domain skill sets such as geology, petroleum engineering, and statistics in the domain of well data management using cross-domain rules ("Constraints) to detect and cross-check the quality of reservoir data. Second, conventional data quality analysis tools are skeletal in nature. For example, some tools do not use Constraints or only check that various well data values are populated with data. Other tools leverage Constraints that are not sufficient to discover well data that is of low-quality. This is because the Constraints are simplistic in nature and do not implement industry-gained wisdom or multi-disciplinary concepts. Third, the described approach uses a DogLeg Severity formula with an innovative definition of a high DogLeg Severity rate. This innovation is effective to, among other things: 1) detect inclusion of incorrect data points; 2) detect missing data points in a well trajectory already kept in a database; and 3) detect a sharp bend that exists in the well trajectory. Fourth, scatter plots are used to predict wrong locations of wells with respect to the rest of the wells in a field. The use of the described approach is effective in predicting and highlighting outlier well location coordinates. Fifth, zig-zag paths in a well trajectory can be detected. Sixth, wrong well locations can be predicted. For example, the described approach can be used to detect other wells within a defined radius from each well in a field. Seventh, where standard naming conventions are used in naming fields, wells, etc. (for example, SAUDI ARAMCO's Unique Well Identifier (UWI) value), once a database has been scanned with the described approach, corrected data can be propagated to other databases with the same data content but stored in a different data model. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

The patent or application file contains at least one color drawing executed in color. Copies of this patent application publication with color drawing(s) will be provided by the Patent and Trademark Office upon request and payment of the necessary fee.

FIG. 9B is a screenshot of a report illustrating a well path exceeding a DogLeg Severity threshold value, according to an implementation of the present disclosure.

FIG. 9E is a screenshot of a report illustrating that the well path of FIG. 9D exceeds a DogLeg Severity threshold value, according to an implementation of the present disclosure.

FIG. 9H is a screenshot of a report illustrating the well trajectory of FIG. 9G containing DogLeg Severity values exceeding a threshold value, according to an implementation of the present disclosure.

FIG. 10 is a screenshot of a well log for a well deeper than the Total Depth of the well, according to an implementation of the present disclosure.

FIG. 14A is a screenshot of a report generated following application of some of the described Constraints to all well data (all fields), according to an implementation of the present disclosure.

FIG. 14B is a screenshot of a report generated following application of some of the described Constraints to all well data in a field, according to an implementation of the present disclosure.

FIG. 14C is a screenshot of a report generated following application of some of the described Constraints to data for one well, according to an implementation of the present disclosure.

Like reference numbers and designations in the various drawings indicate like elements.

DETAILED DESCRIPTION

Figure 1:
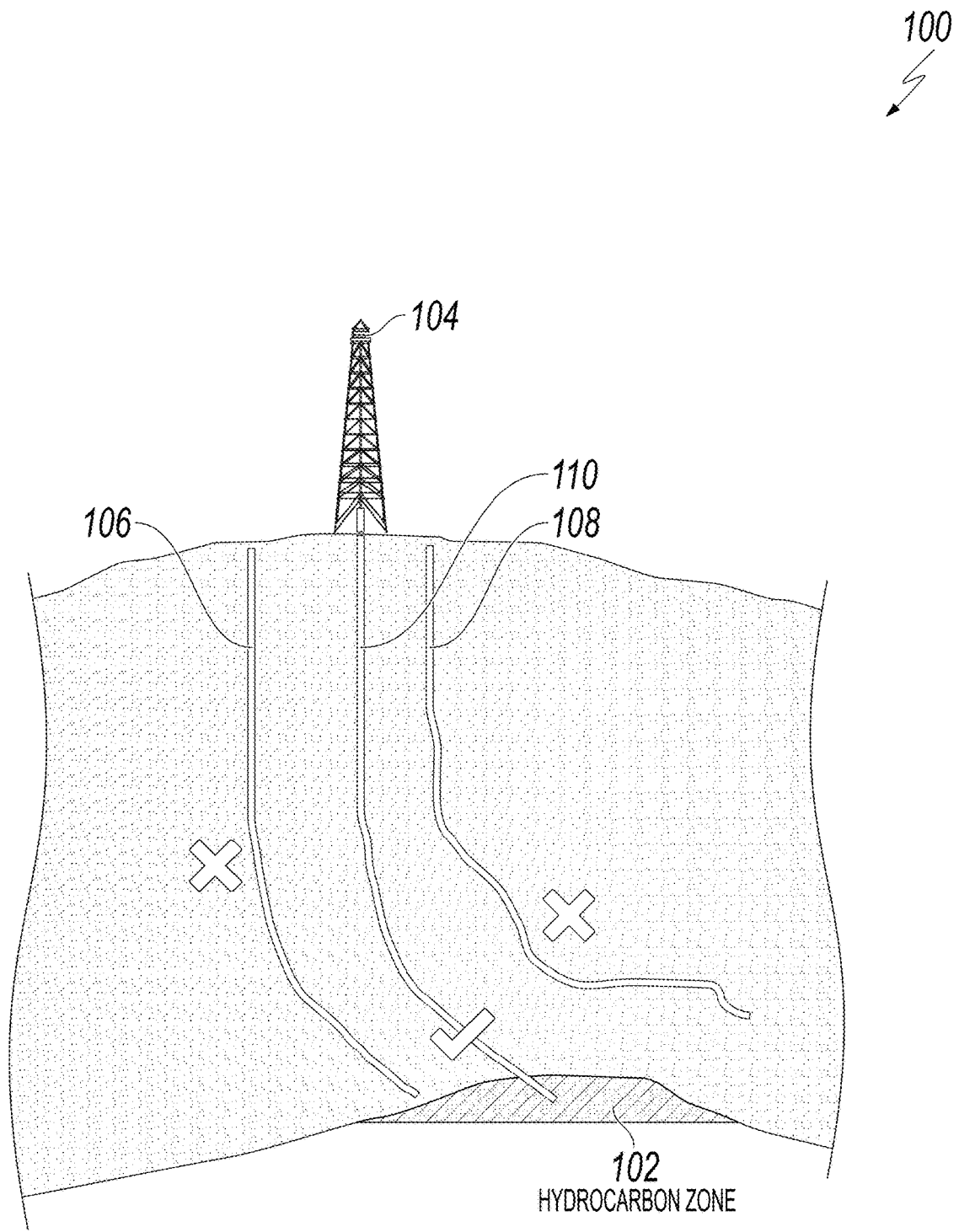
FIG. 1 is an image illustrating example well trajectories with respect to a well drilling to reach a hydrocarbon zone, according to an implementation of the present disclosure.

The following detailed description describes proactive validation and cross-checking of foundational well data ("foundation data") to ensure data integrity, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Hydrocarbon reservoir characterization activities, such as sub-surface mapping, rely on the accuracy and integrity of foundation data, such as well location, trajectory, and well logs to generate sub-surface maps used to guide planning or drilling of a well. While subsurface geological structures and lithological character can be worked out using various techniques (for example, well log analysis, well marker pick, or surface gridding), the techniques assume the use of correct foundation data. While, foundation data is typically gathered from archived data associated with previously drilled wells, this is not a guarantee that the data is of high-quality. Well data with compromised integrity is often unknowingly loaded into databases for future use. However, if low-quality or incorrect data is relied upon or incorporated into a reservoir characterization effort (for example, by geologists or petroleum engineers), a poor end result can negatively influence decision makers into making poor investment or drilling decisions, introduce process inefficiencies, or serve as a genesis for dangerous drilling conditions.

Currently, low-quality or incorrect foundation data is found by chance. For example, a data manager reacts to a report of well trajectory problems from geologists due to a by-chance observation that well trajectory data has a problem. The problem is typically noticed by the geologists by accident (for example, when performing a well marker pick or surface gridding process). Correction can take up-to a week, therefore presenting a delay in a reservoir characterization effort. In another example, less obvious problems in a well trajectory that are not easily discoverable by the data manager, geologists, or low-functionality software tools can "hide" in a database. The associated data can remain in the database and subtly negatively influence output results unless somehow discovered. Additionally, conventional methods do not question, for example, validity and reasonableness of foundation data (such as, a well location).

Once a negative result of a reservoir characterization effort has occurred, conventional methods perform quality control actions against the foundation data (for example, using either manual efforts or low-functionality software tools for analysis) and attempt to remediate the foundation data to avoid at least the negative result that drew attention to the low-quality or incorrect foundation data and for possible future use.

At a high-level, an extensible approach is described for detecting low-quality or incorrect foundation data prior to commencement of a reservoir characterization workflow. Note that the described approach can be used on both previously archived data as well as on new data prior to storage. With respect to the new data, low-quality or incorrect data can be removed from the new data before it has a chance to enter data archives. The approach has the flexibility to be run against data for one well or all wells in a database.

The approach embodies, for example, petroleum engineering, statistics, geology, and data management domains, and is designed to be applicable to the myriad of data structures and models available in hydrocarbon recovery and other industries. Data remediation efforts are properly focused against a generated report of foundation data quality based on a proactive execution of the approach against the foundation data prior to use in the reservoir characterization workflow. The report includes, among other things, easy-to-understand tables, graphs, and graphical presentations (for example, plots) so that data managers and reservoir geoscientists are able to identify suspicious data values and exclude them from use or remediate them.

For purposes of this disclosure, units of various values can be stated in Imperial unit measurements or SI standard measurements (for example, feet (ft), meters (m), or other units. In this disclosure, depth, unless specified otherwise, can be considered to be measured in ft. Other units are either specified, can be considered to be in arbitrary units (AU), or will be apparent to those of ordinary skill in the art.

The described approach provides a number of self-contained, cross-domain quality rules ("Constraints") based on the previously described domain concepts that may not be well understood by specialists/data managers who are responsible for quality of the foundation data in a database. In contrast, conventional data quality analysis tools are skeletal in nature. For example, some conventional tools do not use Constraints or only check that various well data values are populated with data. Other tools leverage Constraints that are not sufficient to discover low-quality foundation data because the basic Constraints are simplistic in nature and do not implement industry-gained wisdom or multi-disciplinary concepts.

Table 1 describes example pre-defined, provided Constraints:

TABLE 1

| Constraint | Description |
|---|---|
| 1 | Rate-of-change of Inclination not greater than 0.1. |
| 2 | Parent and child lateral cannot share trajectory data after a Kick-Off Point. |
| 3 | Well Deviation Survey must have more than a minimum number of deviation survey points. |
| 4 | Delta change of measured depth cannot exceed 100 ft. |
| 5 | Wellbore deviation survey must start at Kick-Off-Point depth and end at Total Depth. |
| 6 | Well Trajectory must not contain a zig-zag path. |
| 7 | Well Trajectory with high DogLeg Severity (greater than 50). Verify the reasonableness of drilling curvature: obeys the law of Physics, respects drilling apparatus material strength. It detects missing trajectory data points, inclusion of invalid data points and presence of sharp bend on curvature. |
| 8 | Well log values are found along well trajectory. Measured Depth (MD) must equal in length or less than Total Depth of Deviation Survey. |
| 9 | Well logs across well laterals start from the same surface location. |
| 10 | Well reference elevation check. |
| 11 | Detection of Wells sharing the same well location coordinates. |

TABLE 1-continued

| Constraint | Description |
|---|---|
| 12 | Detection of well proximity radius <25 m. |
| 13 | Prediction of incorrect well surface location. |
| 14 | Accurate tying between a wellbore and a lateral. |

The approach also permits the introduction of additional Constraints to extend functionality and to target both current and future proprietary and open databases. Although extensible data quality systems exist, none provide ready-to-use Constraints that blend and unify disparate domain knowledge with a purpose to identify low-quality or incorrect foundation data. Moreover, new data can be subjected to Constraint enforcement rules prior to storage to prevent any low-quality or incorrect data from entering data archives.

Some Constraints of the described approach use proprietary algorithms or statistical methods. At least one Constraint uses a DogLeg Severity formula with an innovative choice of a high DogLeg Severity rate. This innovation is effective to, among other things: 1) detect inclusion of incorrect data points; 2) detect missing data points in a well trajectory already kept in a database; and 3) detect a sharp bend that exists in the well trajectory. One or more Constraints permit outlier well location coordinates (for example, within a defined radius from each well in a field) as well as wrong locations of wells with respect to the rest of the wells in a field to be predicted (for example, using scatter or other plots to detect that two distinct well surface locations are the same or too close to each other). One or more other Constraints permit detection of zig-zag paths in a well trajectory.

When applied to foundation data, the approach compares the foundation data against selected Constraints and generates an aggregate score (for example, ranging from 0 to 100—a higher score indicates higher data integrity). The approach also permits a user to navigate through the analyzed foundation data, to further analyze generated data sub-scores that provide a further indication of data quality. Foundation data that satisfies determined thresholds for the aggregate score and sub-scores is deemed to be valid.

Foundation data that fails to satisfy the determined thresholds for the aggregate score or sub-scores (for example, indicating that the foundation data does not make sense from a well planning and drilling point-of-view) is accentuated (such as, highlighted or otherwise marked in some way to draw an analyst's attention) as requiring quality control. For example, wrong well locations, well trajectories that defy the law of physics and are contrary to drilling apparatus strength and material elasticity, and misaligned depth log and well logs can be highlighted to prevent use in reservoir characterization efforts (for example, leading to a pick of well markers at an incorrect depth or location). Accentuating suspicious foundation data permits investigation, exclusion, or remediation of the foundation data to help improve the quality of reservoir characterization output (for example, better definition of strata, surface depiction, and reservoir geological structures).

Using the described approach can speed up the detection of low-quality and incorrect well data. For example, increased precision in well marker picking can improve pore volume and therefore reserve estimates of a reservoir.

In some implementations, an override capability can be provided to mark suspected incorrect data as being valid and having passed quality control. Using the override capability can exclude the suspected incorrect data from being picked up again during a subsequent against selected Constraints.

In implementations where standard naming conventions are used in naming fields, wells, etc. (for example, SAUDI ARAMCO's Unique Well Identifier (UWI) value), once a database has been scanned with the described approach, corrected data can be propagated to other databases with the same data content but stored in a different data model. For example, the SAUDI ARAMCO corporate database can be scanned and corrected. Upon completion of this process, the data (such as, well location and trajectory) can be copied into another database such as HALLIBURTON LANDMARK OPENWORKS.

In some implementation, the output of the described approach can be used to dynamically influence, direct, control, influence, or manage tangible drilling equipment. For example, real-time data received from an ongoing drilling operation can be analyzed using the approach. Depending on a result of the application of one or more Constraints, a wellbore trajectory can be modified, a drill speed can be increased or reduced, a drill can be stopped, an alarm can be activated/deactivated (such as, visual, auditory, or voice alarms), and the like. Other examples can include alerting geosteering and directional drilling staff when wrong directional survey data has been detected (such as, visual, auditory, or voice alarms). In some implementations, the described approach can be integrated as part of a dynamic control system for any equipment consistent with this disclosure.

FIG. 1 is an image illustrating example well trajectories with respect to a well 100 drilling to reach a hydrocarbon zone, according to an implementation of the present disclosure. As illustrated, hydrocarbon zone 102 is laterally offset from a drilling rig 104. To reach the hydrocarbon zone 102, a well trajectory must be modified. If foundation data (for example, obtained from other wells proximate to well 100) is of low quality or incorrect, planned subsurface maps can be imprecise, incorrect, or invalid and result in incorrect drilling trajectory planning. For example, illustrated well trajectory 106 does not intersect with the hydrocarbon zone 102 in an optimum location (here, to one side of the hydrocarbon zone 102). Illustrated well trajectory 108 will not intersect the hydrocarbon zone 102 at all. FIG. 1 demonstrates that the difference between a successful well (for example, with trajectory 110) and a dry well (for example, wells with trajectories 106 or 108), with respect to well trajectory, can be minimal but significant.

Figure 2A:
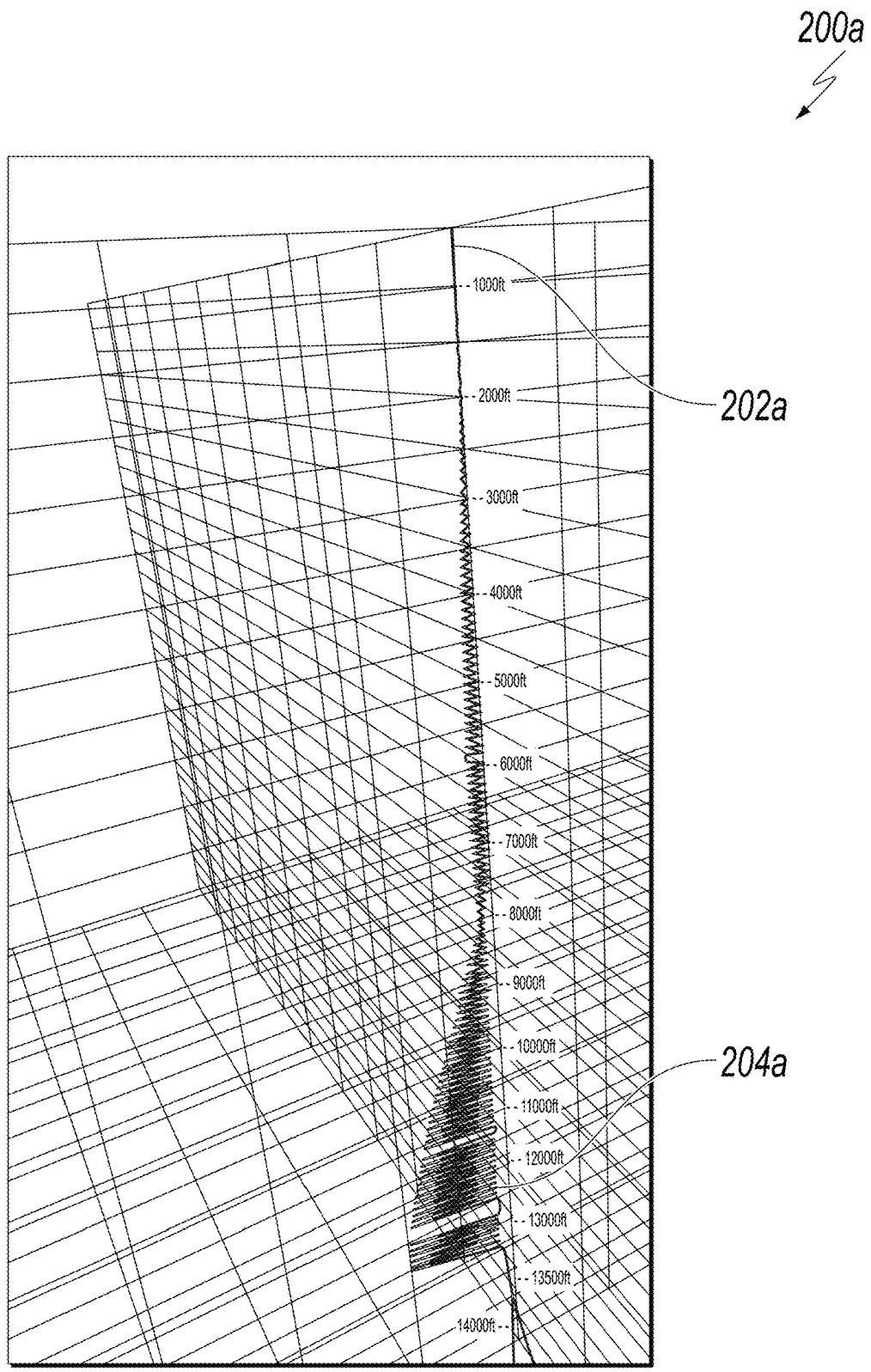
FIGS. 2A and 2B are plots illustrating an example of a well with an incorrect directional survey discovered and remediated by the described approach, according to an implementation of the present disclosure.
Figure 2B:
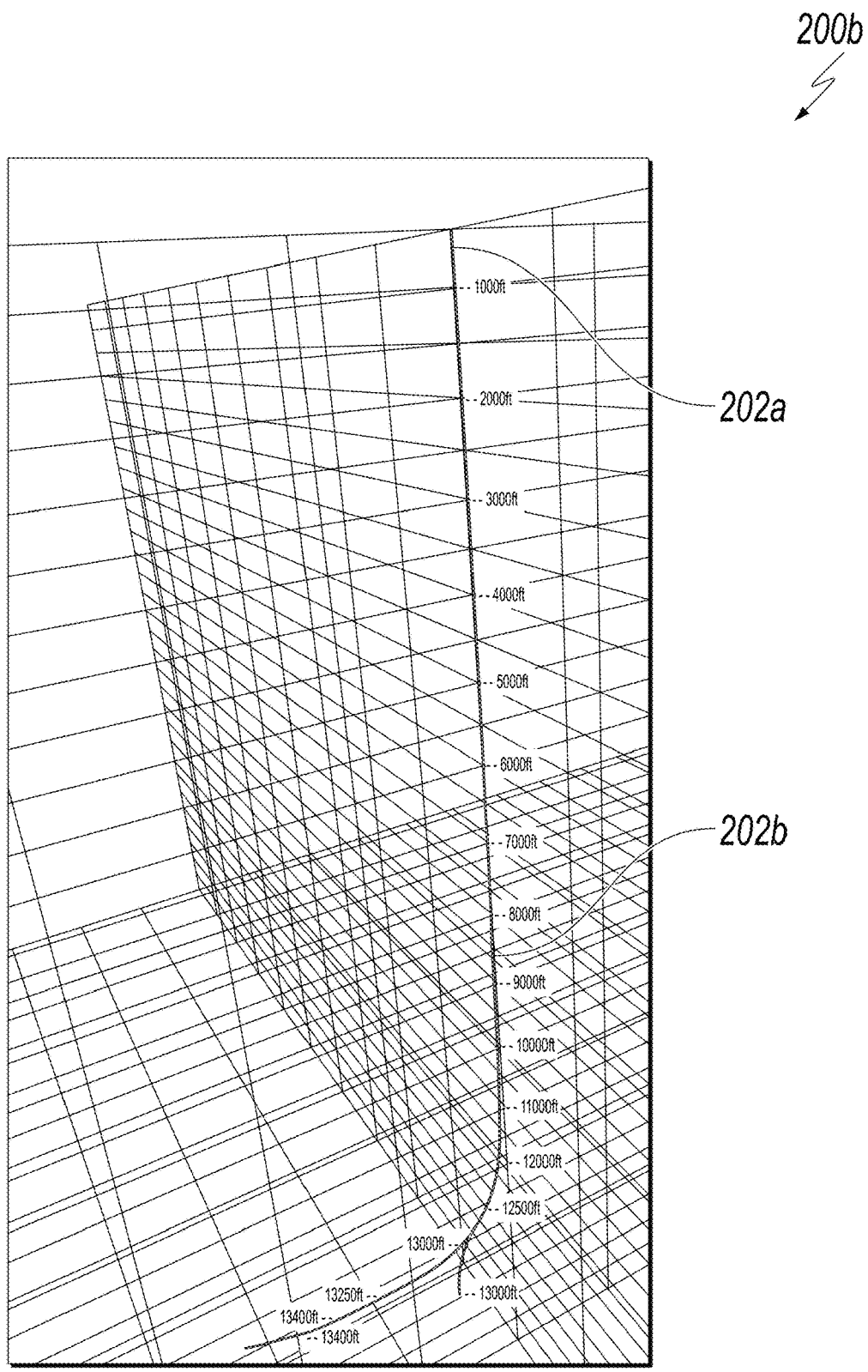

FIGS. 2A and 2B are plots 200a and 200b, respectively, illustrating an example of a well with an incorrect directional survey discovered and remediated by the described approach, according to an implementation of the present disclosure. As illustrated, well 202a in FIG. 2A contains a portion of the well trajectory 204a which has been detected by one or more Constraints and identified as physically impossible to drill. Turning to FIG. 2B, FIG. 2B illustrates the same well 202a after the data used to plan the directional survey has been remediated by the described approach. Note that at least portion 202b of the well 202a has been corrected once low-quality or incorrect data used to plan the direction survey has been removed/remediated.

Figure 3A:
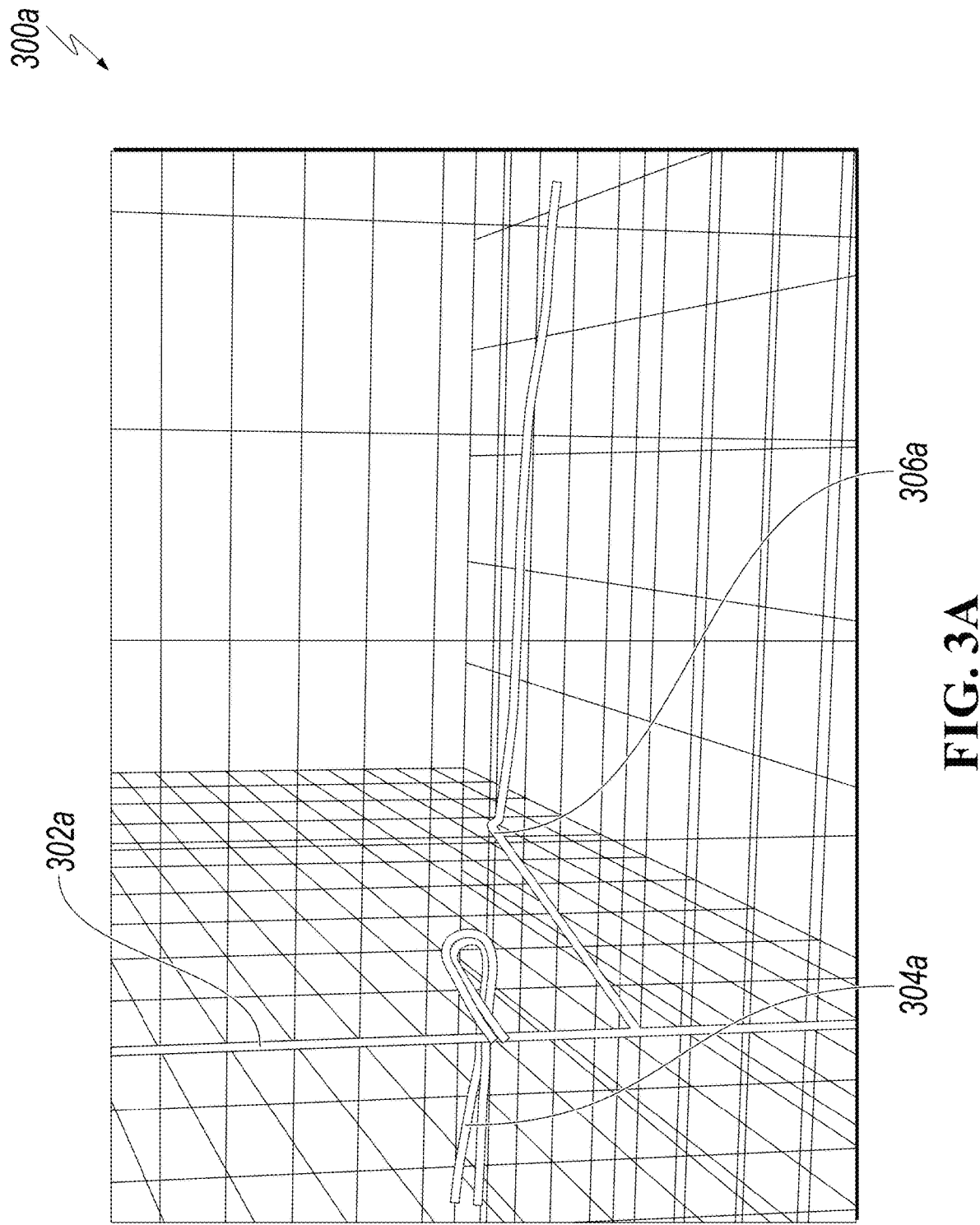
FIGS. 3A and 3B are plots illustrating an example of a well with an incorrect well trajectory discovered and remediated by the described approach, according to an implementation of the present disclosure.
Figure 3B:
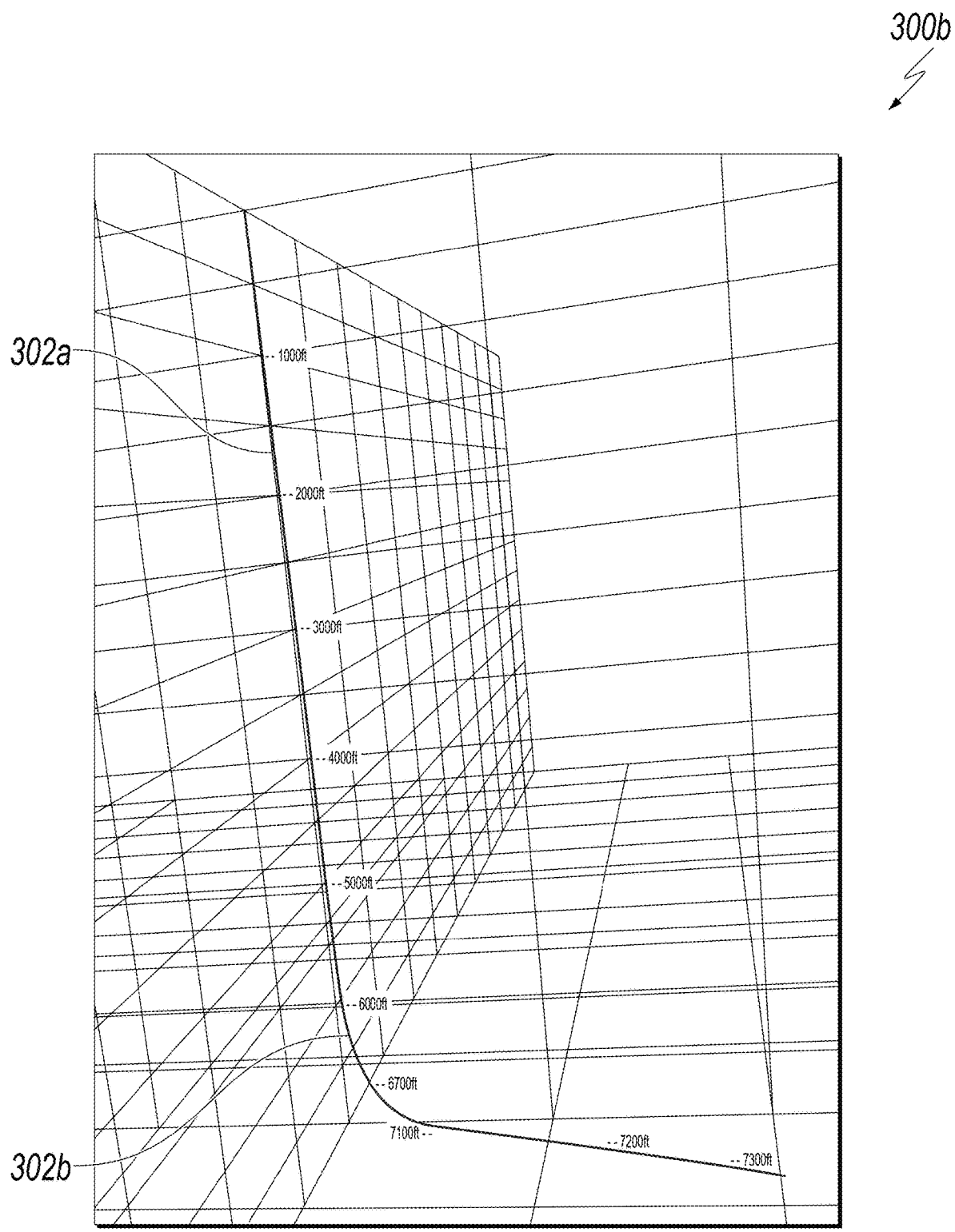

FIGS. 3A and 3B are plots 300a and 300b, respectively, illustrating an example of a well with an incorrect well trajectory discovered and remediated by the described approach, according to an implementation of the present disclosure. As illustrated, well 302a in FIG. 3A contains portions of the well trajectory (for example, 304a and 306a) which has been detected by one or more Constraints and identified as likely invalid. Turning to FIG. 3B, FIG. 3B illustrates the same well 302a after the data used to plan the well trajectory has been remediated by the described approach. Note that the trajectory of well 302a (for example, at 302b) is reported as likely valid once low-quality or incorrect data has been removed/remediated. Also note that likely invalid portions 304a and 306a have been removed from the well trajectory of well 302a.

Figure 4:
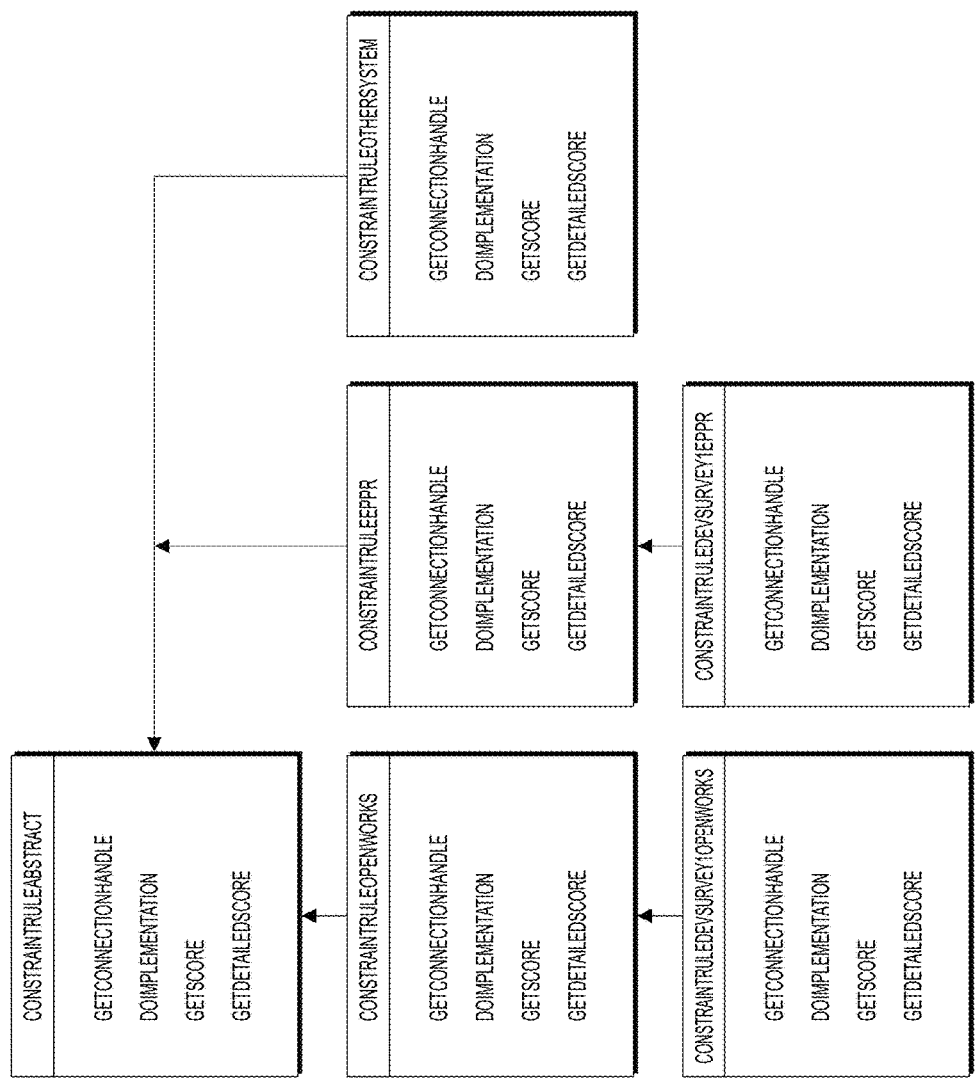
FIG. 4 is a block diagram illustrating an example class-hierarchy design for implementation of Constraints, according to an implementation of the present disclosure.

FIG. 4 is a block diagram illustrating an example class-hierarchy design 400 for implementation of Constraints, according to an implementation of the present disclosure. Extensibility of the described Constraints is due to the ease of implementing a class-hierarchy design, such as class-hierarchy design 400. Ease of implementation permits applicability of the example class-hierarchy design 400 with any type of data repository (for example, vendor-based, in-house, or a spreadsheet).

Figure 5:
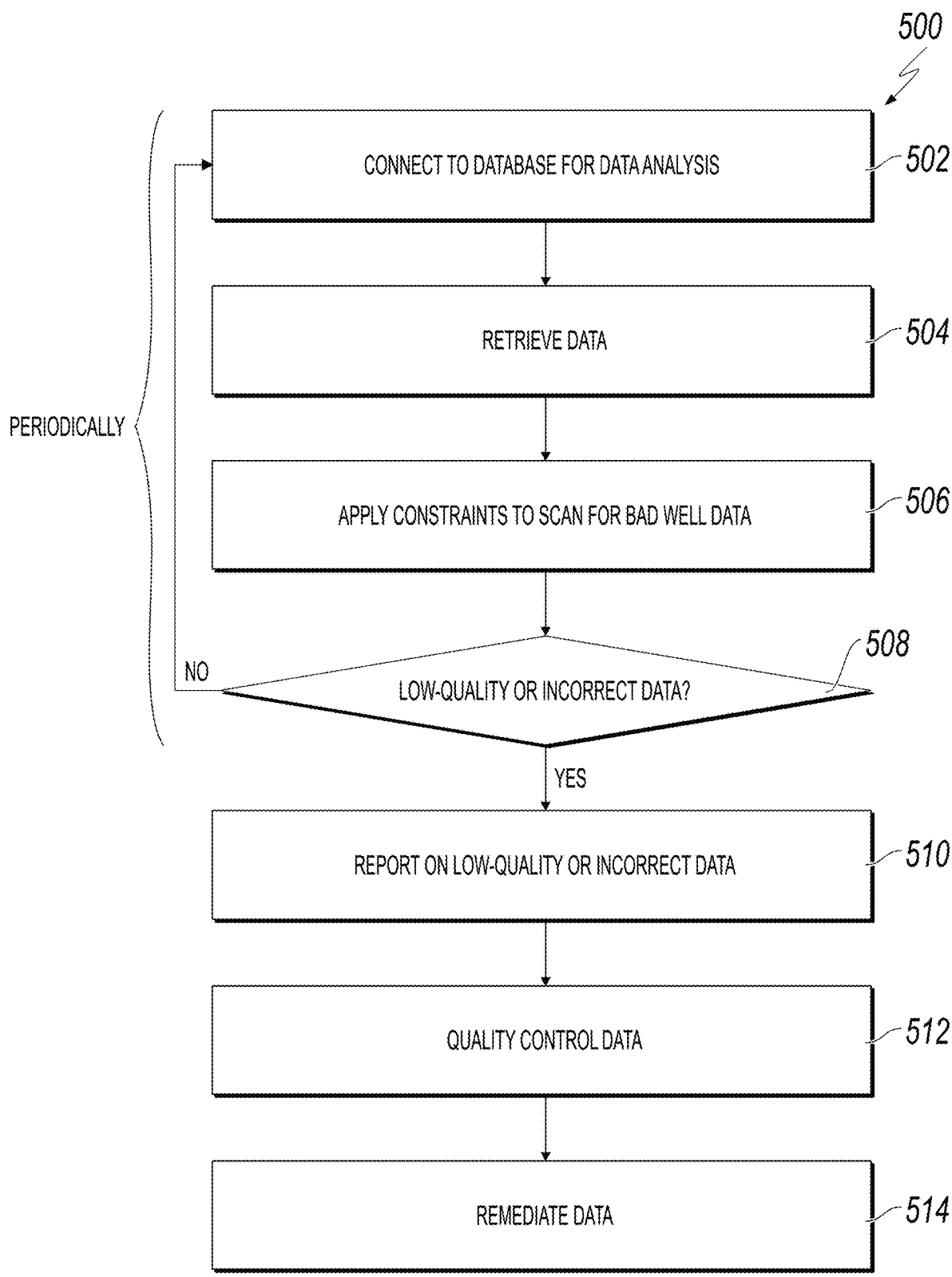
FIG. 5 is a flow chart illustrating an example method for proactive validation and cross-checking of foundation data to ensure data integrity, according to an implementation of the present disclosure.

FIG. 5 is a flow chart illustrating an example method 500 for proactive validation and cross-checking of foundation data to ensure data integrity, according to an implementation of the present disclosure. For clarity of presentation, the description that follows generally describes method 500 in the context of the other figures in this description. However, it will be understood that method 500 may be performed, for example, by any suitable system, environment, software, and hardware, or a combination of systems, environments, software, and hardware, as appropriate. In some implementations, various steps of method 500 can be run in parallel, in combination, in loops, or in any order.

In some implementations, on a periodic basis:

At 502, a database containing well data is connected to for analysis. For example, the database can contain well data from previously drilled wells. Historical well data may contain invalid data, which is taken for granted as being valid data. Additionally, as new data is being input into the database, the described approach can be deployed to analyze and verify the new data (for example, well trajectory and location information for just one well). This ensures the service provider delivers quality work and data to the company upon completion of drilling. This ensures a service provider delivers quality work and data upon completion of drilling. From 502, method 500 proceeds to 504.

At 504, data is retrieved from the database for analysis. For example, data can be retrieved for all fields, a single field, or for one well. From 504, method 500 proceeds to 506.

At 506, selected Constraints (for example, the previously described Constraints or other Constraints) are applied to the retrieved data. From 506, method 500 proceeds to 508.

At 508, a determination is made as to whether low-quality or incorrect data has been detected in the retrieved data. If it is determined that low-quality or incorrect data has not been detected in the retrieved data, method 500 proceeds back to 502. Otherwise, if it is determined that low-quality or incorrect data has been detected in the retrieved data, method 500 proceeds to 510.

At 510, detected low-quality or incorrect data is reported. For example, detected low-quality or incorrect data can be highlighted to indicate the particular data to quality control and remediate. From 510, method 500 proceeds to 512.

At 512, the detected low-quality or incorrect data is analyzed for quality control. For example, if well log data is deeper than a directional survey, it means that one of the data types is wrong (that is, either the well log or the directional survey). From 512, method 500 proceeds to 514.

At 514, the detected low-quality or incorrect data is remediated (for example, wrong data types can be repaired, fixed, or replaced based on the quality control analysis. After 514, method 500 stops.

One or more steps of method 500 can also be performed on data prior to storage in the database of 502. For example, new well data can be stored in a separate, temporary database and accessed for application of Constraints and remediation (if necessary) prior to storage in the database of 502 (such as application of 504-516).

While the steps of method 500 are indicated as being performed on a periodic basis, in some implementations, method 500 can be performed on a regular/scheduled basis. For example, a regular database job can be configured to apply Constraints to the data in the database (such as, newly added data since the last run of method 500 or to the entire data set due to newly-added or updated Constraints) to detect low-quality or incorrect data.

Constraints

The following example Constraints (for example, rules, conditions, equations, or methodologies) are provided to assist with understanding of the described approach. As will appreciated by those of ordinary skill in the art, there are multiple ways in which Constraints can be defined that are consistent with this disclosure. The presented example constraints are not meant to limit the describe approach in any way. Other constraints consistent with this disclosure are also considered to be within the scope of this disclosure.

At a high-level, a well trajectory in any data model can be expressed as an array of points, each point including, for example, a measured depth, azimuth, and angle attribute value. Table 2 provides an example of well trajectory data:

TABLE 2

| Measured Depth | Azimuth | Angle |
|---|---|---|
| 0 | 0 | 0 |
| 138 | 119.8 | .68 |
| 201 | 115.45 | .68 |
| 292 | 118.09 | .7 |
| 382 | 142.44 | .69 |
| 476 | 120.26 | .66 |
| 564 | 125.09 | .66 |

With a surface coordinate (x, y), the position of each point in a three-dimensional (3D) coordinate system can be worked out using the above data attribute values.

Constraint 1—Rate-of-Change of Inclination not Greater than 0.1

A constraint on a well trajectory to verify if a rate-of-change of down-hole inclination is physically realistic for a typical drilling case. To calculate a rate-of-change of inclination, two well trajectory points are needed, as specified in Equation (1):

$$\text{Rate-of-Change} = \delta \text{ Inclination}/\delta \text{ Measured Depth} \quad (1).$$

Using Equation (1), the rate-of-change is calculated between two consecutive points for all points in a given well trajectory. Well data containing a rate-of-change that exceeds a threshold value will be flagged as containing suspect data (for example, incomplete trajectory data).

In some implementations, the threshold value is settable property. For example, through experimentation, a rate-of-change greater than 0.1 degrees/foot has been determined as being symptomatic of an incorrect well trajectory. In other implementations, the threshold value can be dynamically determined based on any data value(s) consistent with this disclosure.

Table 3 represents example reported statistics of the application of Constraint 1 to well data from several fields:

TABLE 3

| Field | Total wellbores not meeting constraint |
|---|---|
| 1 | 23 |
| 2 | 18 |
| 3 | 353 |
| 4 | 157 |
| 5 | 182 |
| 6 | 5 |
| 7 | 20 |
| 8 | 2 |

In typical implementations, other example reports for other Constraints are similar in form to Table 3 and are not illustrated in this disclosure.

Constraint 2—Parent and Child Lateral Cannot Share Trajectory Data after a Kick-Off-Point Well laterals branch off from a main wellbore or another lateral (that is, a parent lateral). A valid well lateral trajectory must share only the same trajectory from its parent from the surface until a Kick-Off-Point of the lateral. In an implementation, the methodology used to determine whether well lateral trajectories are acceptable is:

If there is commonality of trajectory between the parent well or parent lateral and the well lateral, after the Kick-Off-Point of the same well lateral, then the well lateral and its parent is marked as containing questionable well lateral trajectory data.

A trajectory commonality check is performed only after the Kick-Off-Point of the well lateral from its parent. The parent and child lateral are considered to have the same trajectory if all following matches starting from the Kick-Off-Point:

Measured Depth,

Inclination, and

Azimuth.

Figure 6:
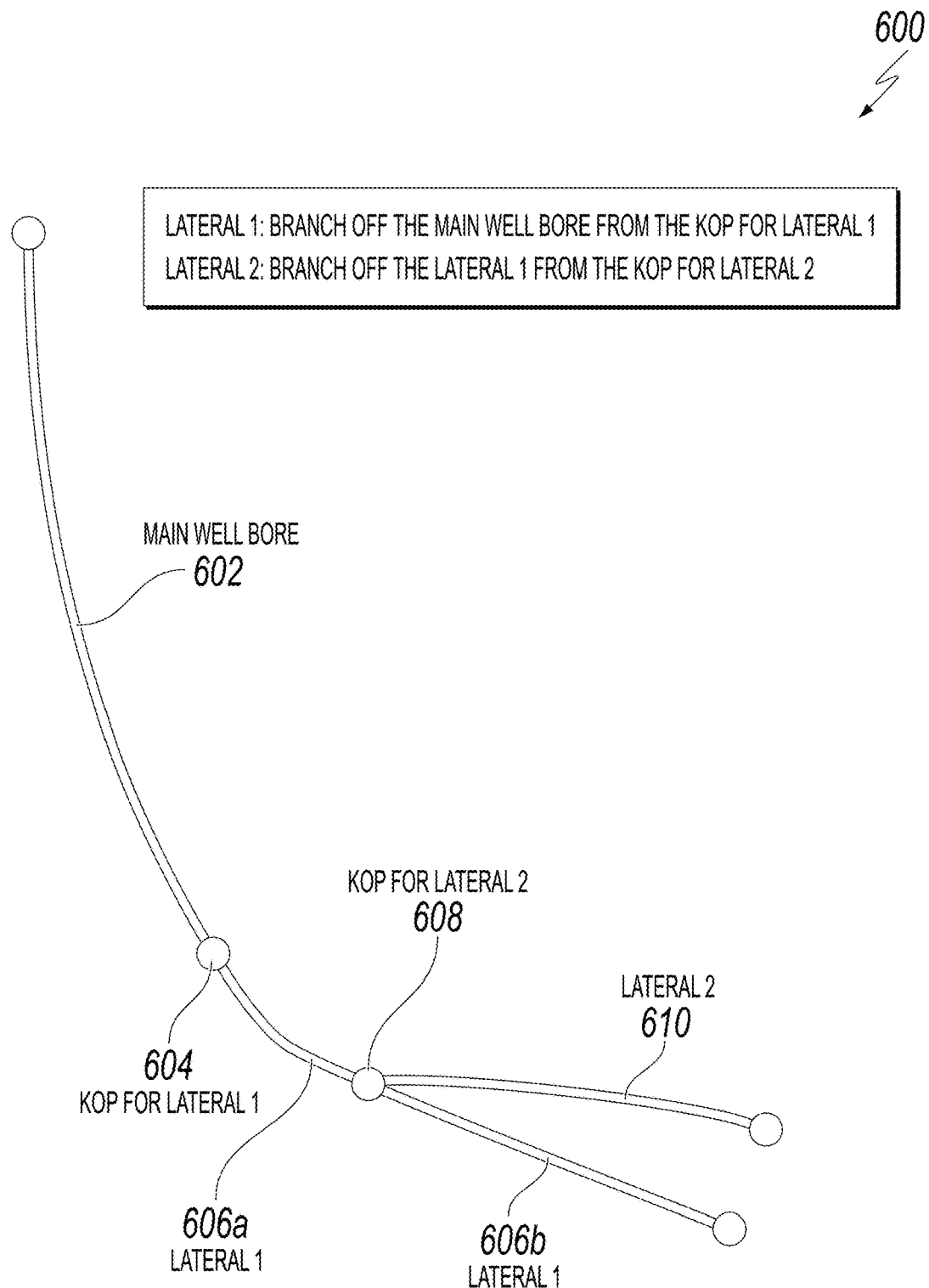
FIG. 6 is a diagram illustrating a relationship between a parent bore and a child lateral, according to an implementation of the present disclosure.

FIG. 6 is a diagram 600 illustrating a relationship between a parent bore and a child lateral, according to an implementation of the present disclosure. As illustrated, main wellbore 602 has a Kick-Off-Point 604 for Lateral 1 (including 606*a* and 606*b*). Lateral 1 has a Kick-Off-Point 608 for Lateral 2 610. According to the prior description, a trajectory commonality check is performed only after the Kick-Off-Point of the well lateral from its parent. Here, a trajectory commonality check is performed after the Kick-Off-Point 604 and Kick-Off-Point 608. The parent and child lateral are considered to have the same trajectory if Measured Depth, Inclination, and Azimuth match of the main wellbore 602 and Lateral 1 606*a*/606*b* (starting from Kick-Off-Point 604). Similarly, The parent and child lateral are considered to have the same trajectory if Measured Depth, Inclination, and Azimuth match of Lateral 1 606*a* and Lateral 2 (starting from Kick-Off-Point 608).

Constraint 3—Well Deviation Survey Must have More than a Minimum Number of Deviation Survey Points This constraint ensures that there are no missing points in a well trajectory being scanned in the database. The theoretical minimum number of deviation survey points can be calculated, as specified in Equation (2):

$$\text{Minimum number of points} = \text{Total Depth}/100 \quad (2),$$

or, in the case of a lateral, as specified in Equation (3):

$$\text{Minimum number of points} = (\text{Total Depth} - \text{Kick-Off-Point depth})/100 \quad (3).$$

If a lateral branches off from another borehole at a Kick-Off-Point, this constraint will also check, using Equation (4), if there are more data points than the minimum number of points above the Kick-Off-Point depth:

$$\text{Minimum number of points} = \text{Kick-Off-Point depth} / 100 \qquad (4).$$

Equations (2), (3), and (4) are typically stated in Imperial unit measurements (for example, ft). In some implementations, Equations (2), (3), and (4) can be stated in SI standard measurements (m) or other units.

Constraint 4—Delta Change of Measured Depth Cannot Exceed 100 ft

This constraint is used to search for wells with incomplete or missing deviation survey data points. Constraint 4 sets a tolerable threshold value for a delta change in a Measured Depth value between two consecutive data points. In some implementations, the threshold value can be manually or dynamically set.

Figure 7:
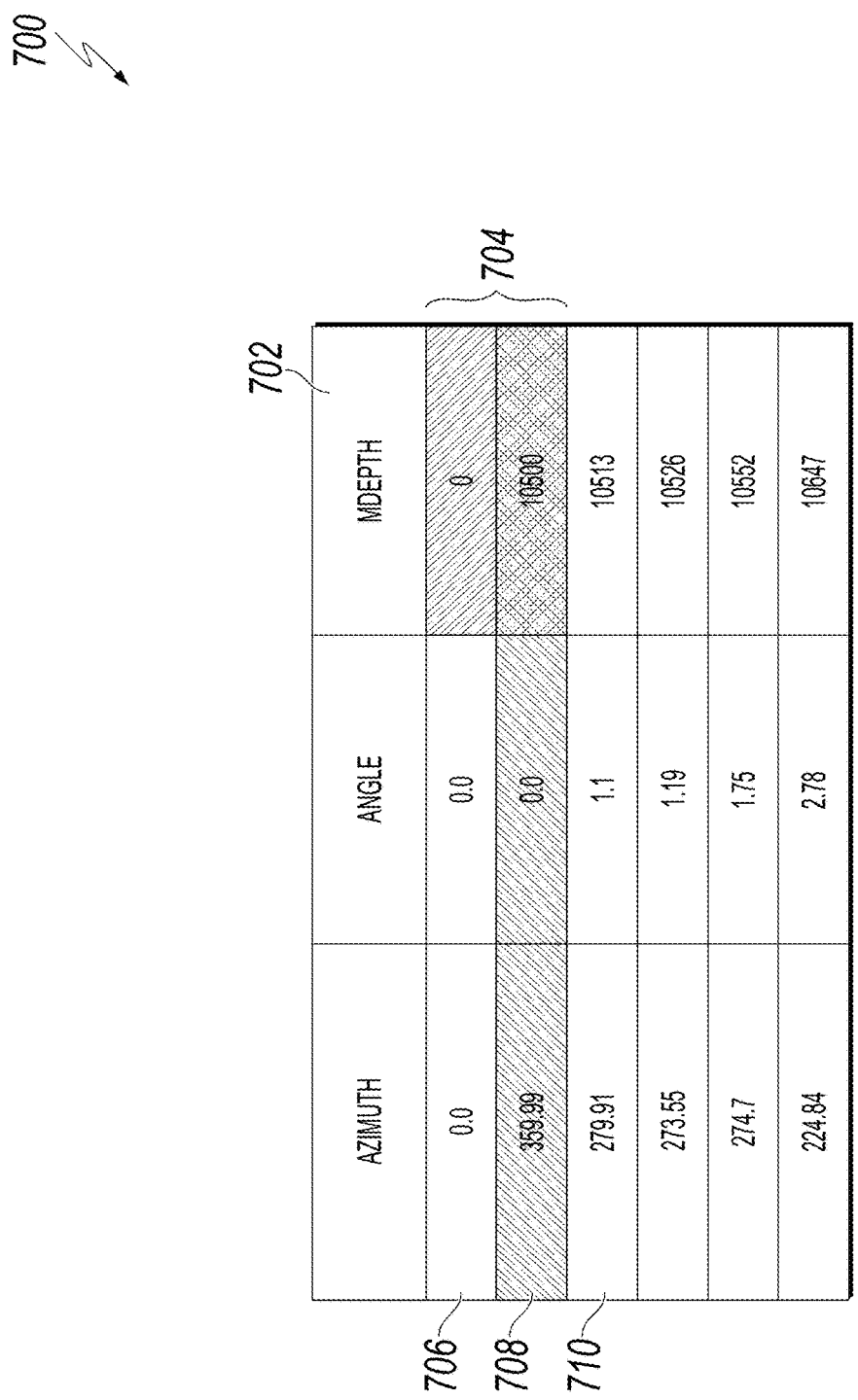
FIG. 7 is a table illustrating a wellbore trajectory with a delta change of a Measured Depth exceeding a tolerable unit, according to an implementation of the present disclosure.

FIG. 7 is a table 700 illustrating a wellbore trajectory with a delta change of a Measured Depth exceeding a tolerable unit, according to an implementation of the present disclosure. As illustrated, the Measured Depth (MDepth) 702 has exceeded a tolerable threshold value for a delta change 704 between consecutive data points 706 and 708.

Consistent with the prior discussion, the delta change has been highlighted. For example, the threshold value for a Measured Depth delta change could be configured to a value of 100 ft. In the example of FIG. 7, the delta change between 0-10500 ft would exceed the threshold value delta change of 100 ft, which is symptomatic of incomplete deviation survey data. In comparison, the delta change between consecutive data points 708 and 710 would only be 13 ft (that is, 10513 ft-10500 ft).

Constraint 5—Wellbore Deviation Survey Must Start at a Kick-Off-Point Depth and End at a Total Depth In most well-related database (for example, exploration and producing) data models, the Kick-Off-Point depth and Total Depth of the wellbores are recorded. This constraint performs a simple comparison to ensure that all deviation survey points of the wellbore are in between the Kick-Off-Point and Total Depth depth points.

Constraint 6—Well Trajectory Must not Contain a Zig-Zag Path

Zig-zag in a wellbore path can be identified by a sudden change of inclination between two wellbore trajectory points (I). Constraint 6 is able to identify repeatedly step angle change indicative of a suspicious drilling path. In some implementations, the conditions that must be met to suspect a zig-zag in a wellbore path are:

δ Inclination$_1$=I$_2$–I$_1$ AND δ Inclination$_1$>7°,
δ Inclination$_2$=I$_1$–I$_2$ AND δ Inclination$_2$>7°, and
δ Inclination$_1$*δ Inclination$_2$<0.

Figure 8A:
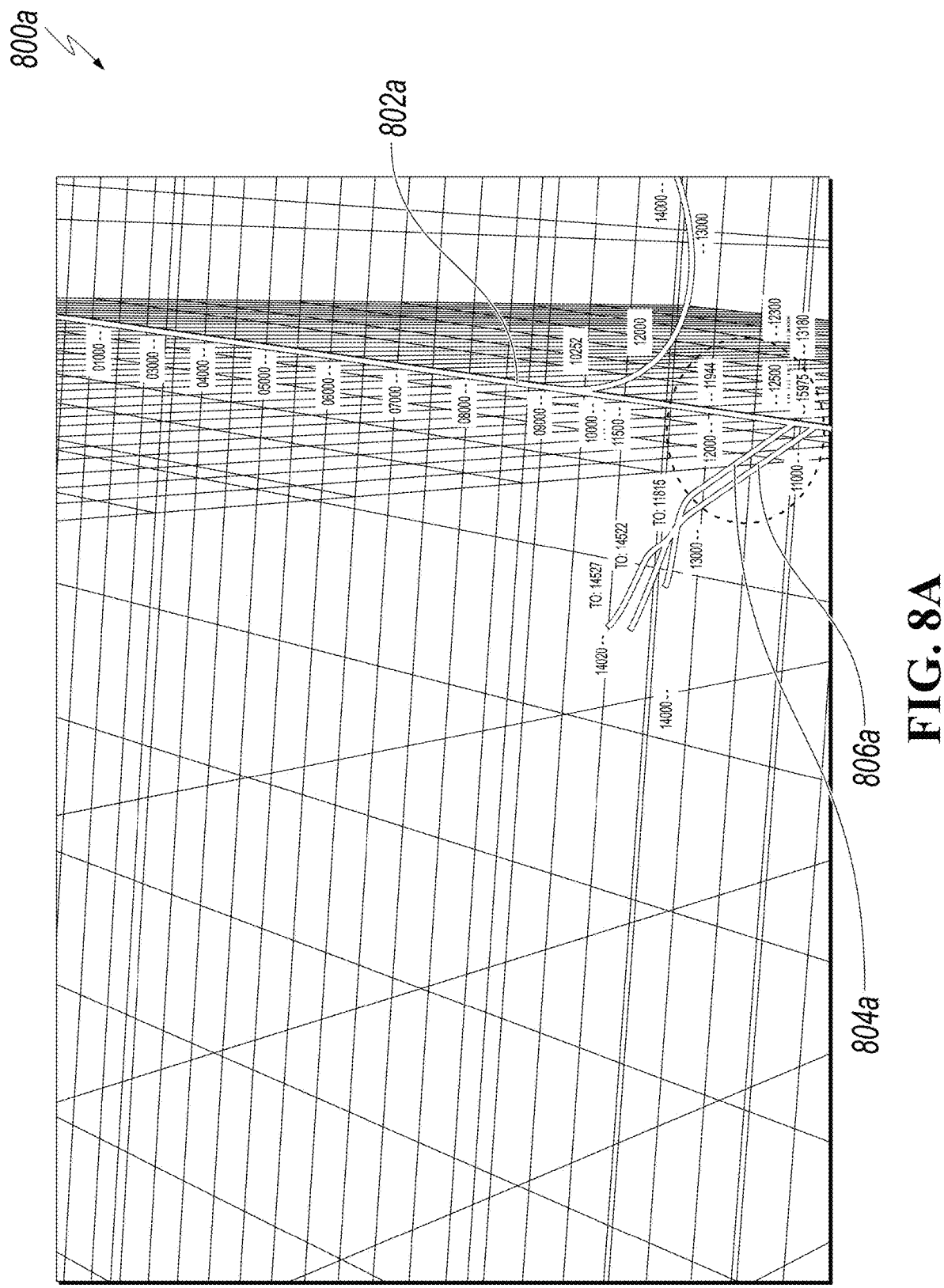
FIG. 8A is a plot illustrating a drilling path with a sharp bend detected by an anti-zig-zag Constraint, according to an implementation of the present disclosure.

FIG. 8A is a plot 800a illustrating a drilling path with a sharp bend detected by an anti-zig-zag Constraint, according to an implementation of the present disclosure. As illustrated, in drilling path 802a, sharp bends 804a and 806a are detected by Constraint 6. The sharp bends 804a and 806a are indicative of a suspicious drilling path.

Figure 8B:
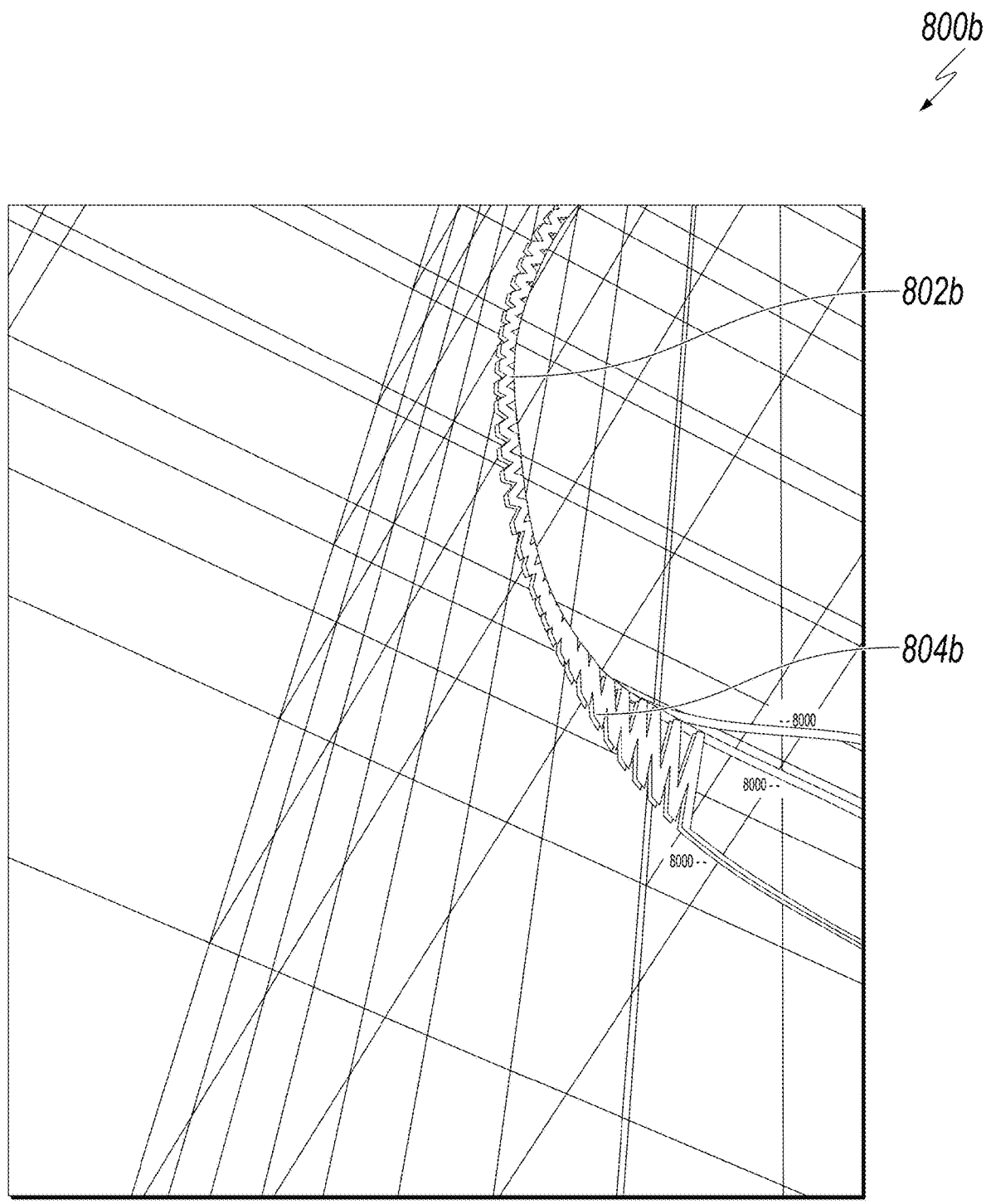
FIG. 8B is a plot illustrating a drilling path with a zig-zag path detected by the anti-zig-zag Constraint, according to an implementation of the present disclosure.

FIG. 8B is a plot 800b illustrating a drilling path with a zig-zag path detected by the anti-zig-zag Constraint, according to an implementation of the present disclosure. As illustrated, in drilling path 802b, a zig-zag (for example, at 804b) is detected by Constraint 6. The detected zig-zag 804b is indicative of a suspicious drilling path.

Constraint 7—Well Trajectory with a High DogLeg Severity (Greater than 50)

Drilling technology limits the angle of the bend when a deviated well (that is, a "DogLeg") is drilled. Petroleum engineers use a formula to plan a drilling trajectory in order to minimize the DogLeg Severity to avoid damage to drill bits, avoid getting the drill stuck, and to minimize casing wear-out and torque/drag.

Constraint 7 introduces a drilling engineer's domain into the integrity checks and highlights a well trajectory that is out-of-norm and physically impossible to achieve during drilling. To drilling engineers, a high DogLeg Severity rate is typically anything above 14°/100 ft. However, the DogLeg Severity rate value used in Constraint 7 is set to a threshold value of 50; much higher than a drilling engineer's DogLeg Severity threshold value. A DogLeg Severity value that exceeds a threshold value of 50 has been determined to flag the most suspicious of well trajectory curvatures.

For two consecutive trajectory points, DogLeg Severity can be calculated by Equation (5):

$$\text{DogLeg Severity} = \{\cos^{-1}[(\cos I_1 * \cos I_2) + (\sin I_1 * \sin I_2) * \cos(A_2 - A_1)]\} * (100/\delta MD) \qquad (5),$$

with Inclination angle (I), Measured Depth (MD), and Azimuth (A). Subscript$_2$ references a deeper point while subscript$_1$ references a shallower point.

Figure 9A:
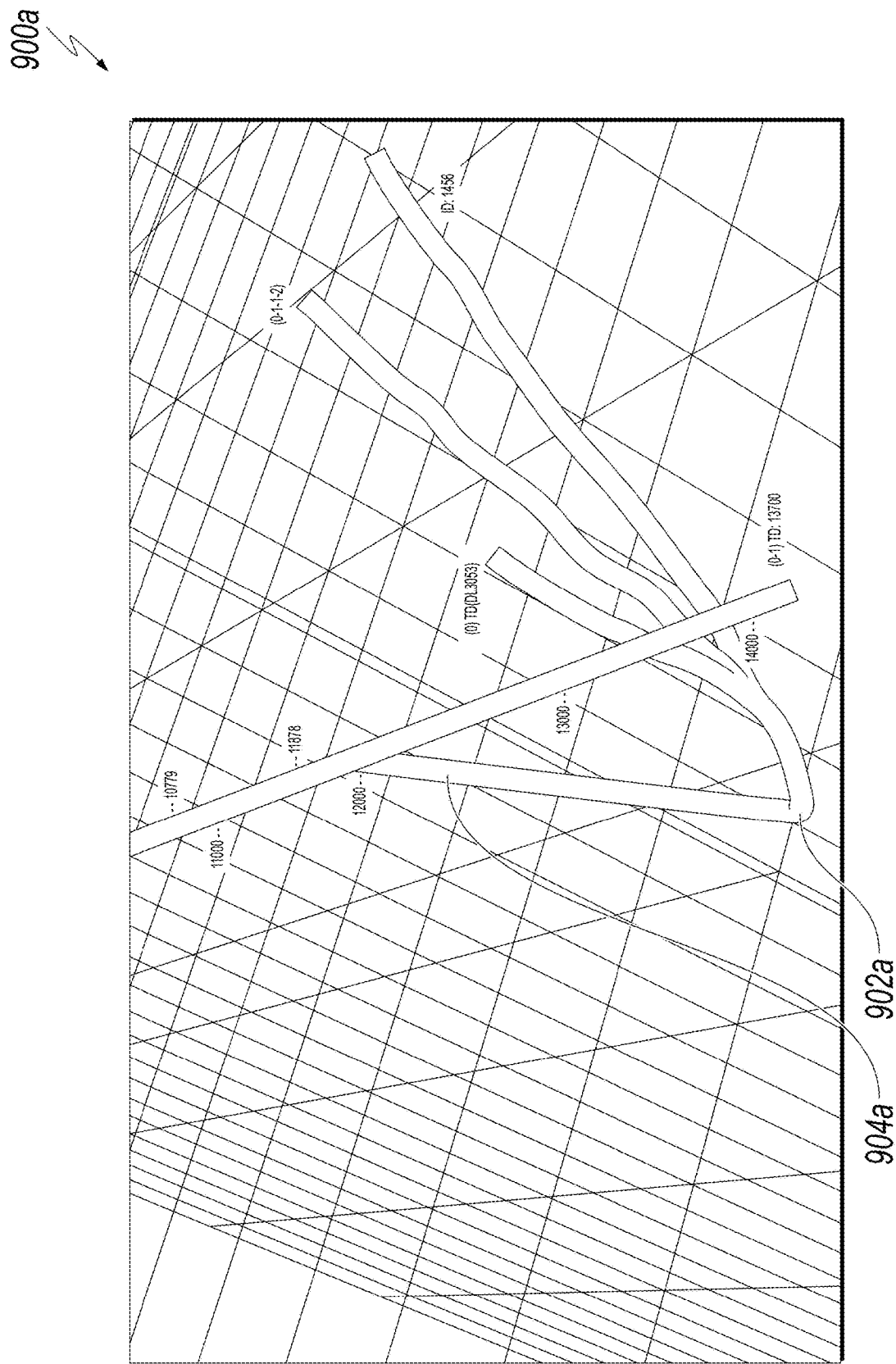
FIG. 9A is a plot illustrating a well path exceeding a DogLeg Severity threshold value, according to an implementation of the present disclosure.

FIG. 9A is a plot 900a illustrating a well path exceeding a DogLeg Severity threshold value (for example, 50), according to an implementation of the present disclosure. As illustrated, depth 902a exhibits an extreme bend in a well path 904a that exceeds the DogLeg Severity threshold value of 50 around a depth of 13300 ft to 13500 ft.

FIG. 9B is a screenshot of a report 900b illustrating a well path exceeding a DogLeg Severity threshold value (for example, 50), according to an implementation of the present disclosure. As illustrated, at 13303 ft, the calculated DogLeg Severity value 902b is 183.61, much higher than the DogLeg Severity threshold value of 50.

Figure 9C:
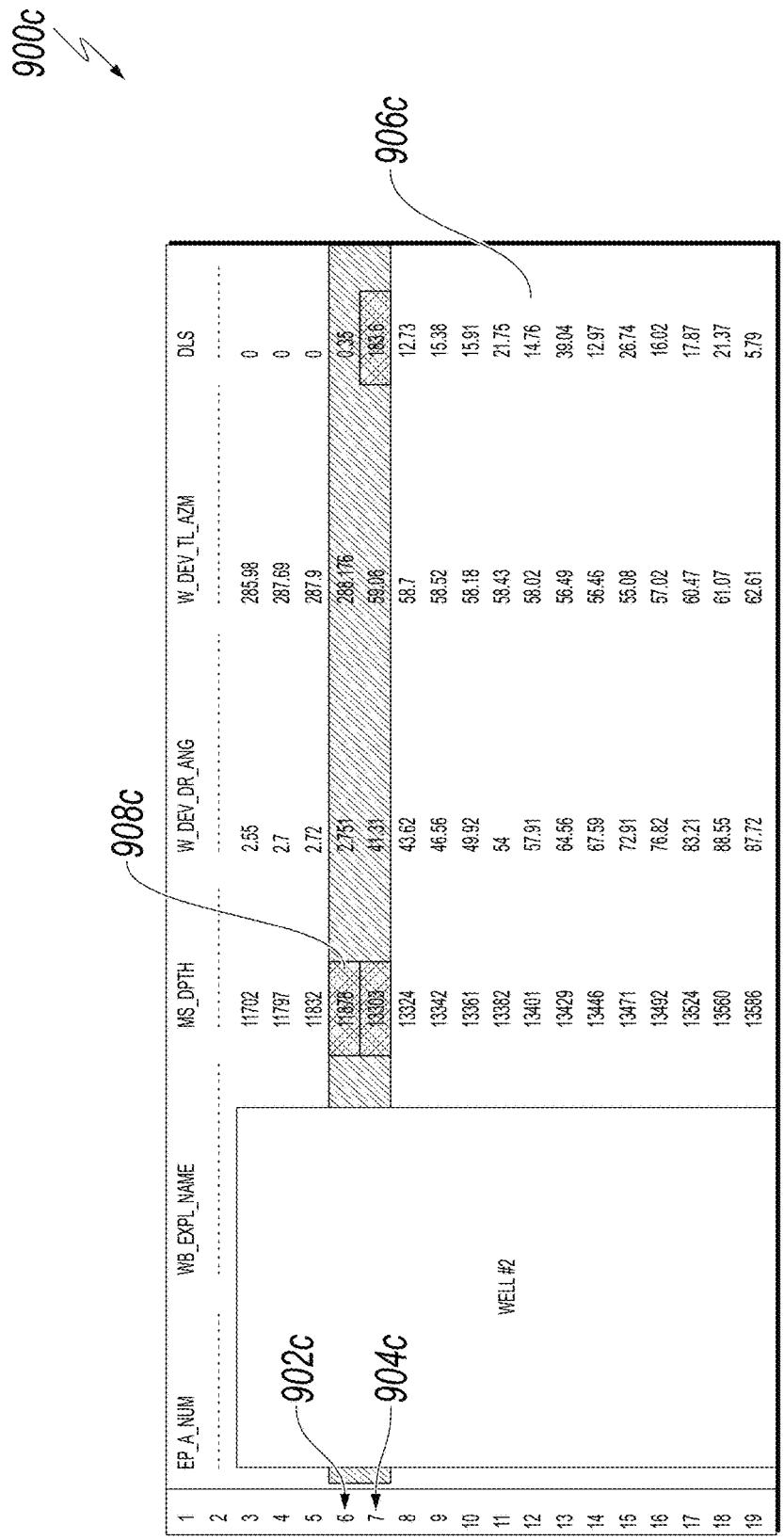
FIG. 9C is a screenshot of a report illustrating an extreme rate-of-change, indicating one or more missing trajectory points in a well path, according to an implementation of the present disclosure.

FIG. 9C is a screenshot of a report 900c illustrating an extreme rate-of-change, indicating one or more missing trajectory points in a well path, according to an implementation of the present disclosure. As illustrated, a high DogLeg Severity rate can be explained by examining the Measured Depth (MS DPTH) difference between trajectory point 6 902c and trajectory point 7 904c. The described approach will flag the DogLeg Severity value 906c as exceeding the DogLeg Severity threshold value of 50. The Measured Depth difference between trajectory points 902c and 904c is 1,425 ft. In some implementations, the described approach cam report the reason of the detected high DogLeg Severity rate as: "possible missing trajectory data points" (or some similar message) due to the difference being greater than 100 ft.

Figure 9D:
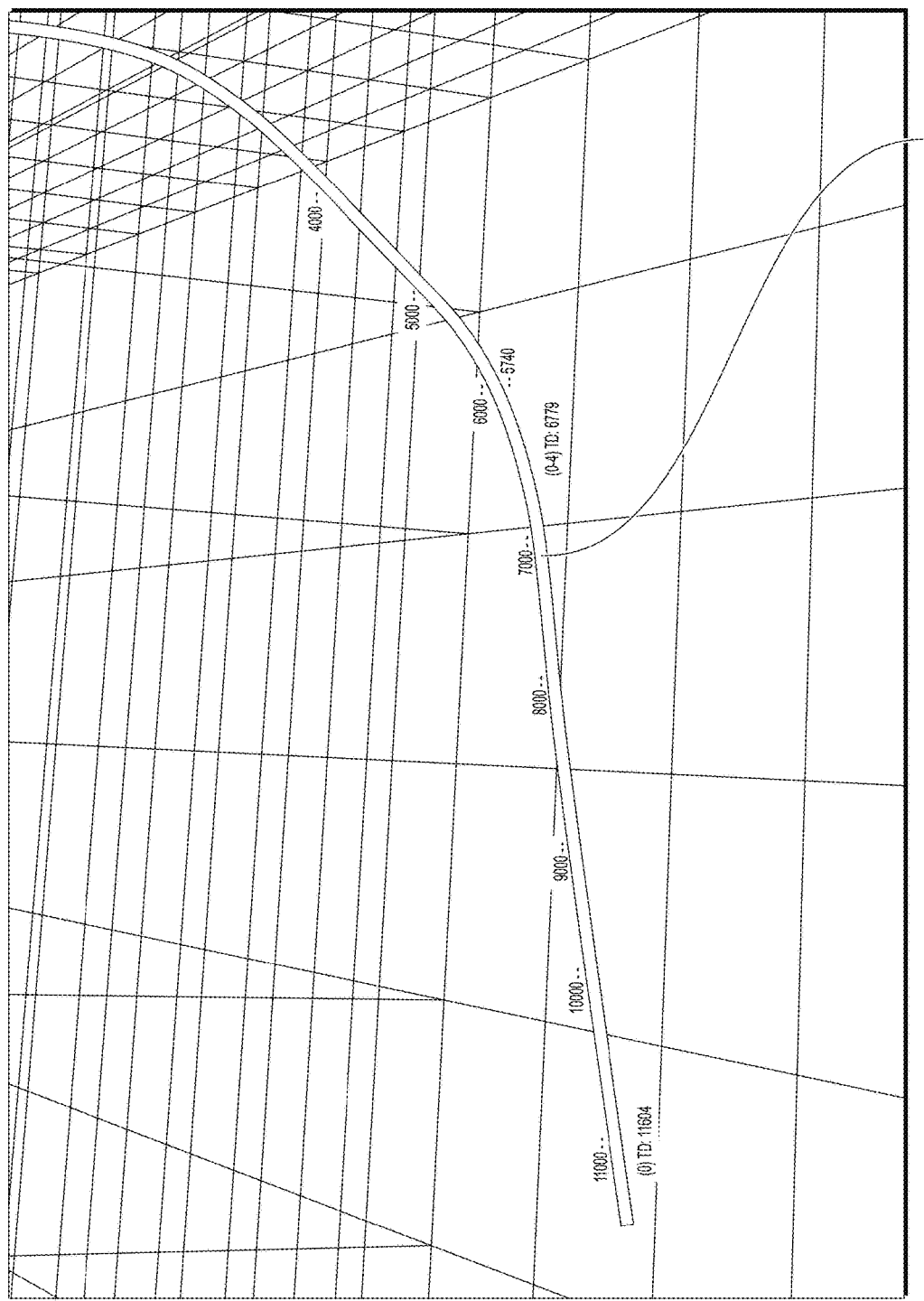
FIG. 9D is a plot illustrating a well path that appears to have a perfectly reasonable well trajectory but, in actuality, has a high DogLeg Severity rate, according to an implementation of the present disclosure.

FIG. 9D is a plot 900d illustrating a well path that appears to have a perfectly reasonable well trajectory but, in actuality, has a high DogLeg Severity rate, according to an implementation of the present disclosure. As illustrated, well path 902d appears in plot 900d to be perfectly valid. However, when trajectory data is analyzed, well path 902d actually contains a high DogLeg Severity rate.

FIG. 9E is a screenshot of a report 900e illustrating that the well path of FIG. 9D exceeds a DogLeg Severity threshold value (for example, 50), according to an implementation of the present disclosure. As illustrated, well path 902d contains a DogLeg Severity value 902e of 1509.4 at 5740 ft. On closer inspection of the trajectory point data, the high DogLeg Severity rate 902e can be understood as being caused by the inclusion of an incorrect data point in its trajectory.

Figure 9F:
FIG. 9F is a screenshot of a report illustrating a possible inclusion of an incorrect data point, according to an implementation of the present disclosure.

FIG. 9F is a screenshot of a report 900f illustrating a possible inclusion of an incorrect data point, according to an implementation of the present disclosure. As illustrated, the difference 902f between depth values (that is, between 5740 and 5741) is only 1 foot. In some implementations, the described approach will highlight this situation and report the reason for the high DogLeg Severity rate as: "possible inclusion of incorrect data points" due to a Measured Depth difference of less than 10 ft between data points.

Figure 9G:
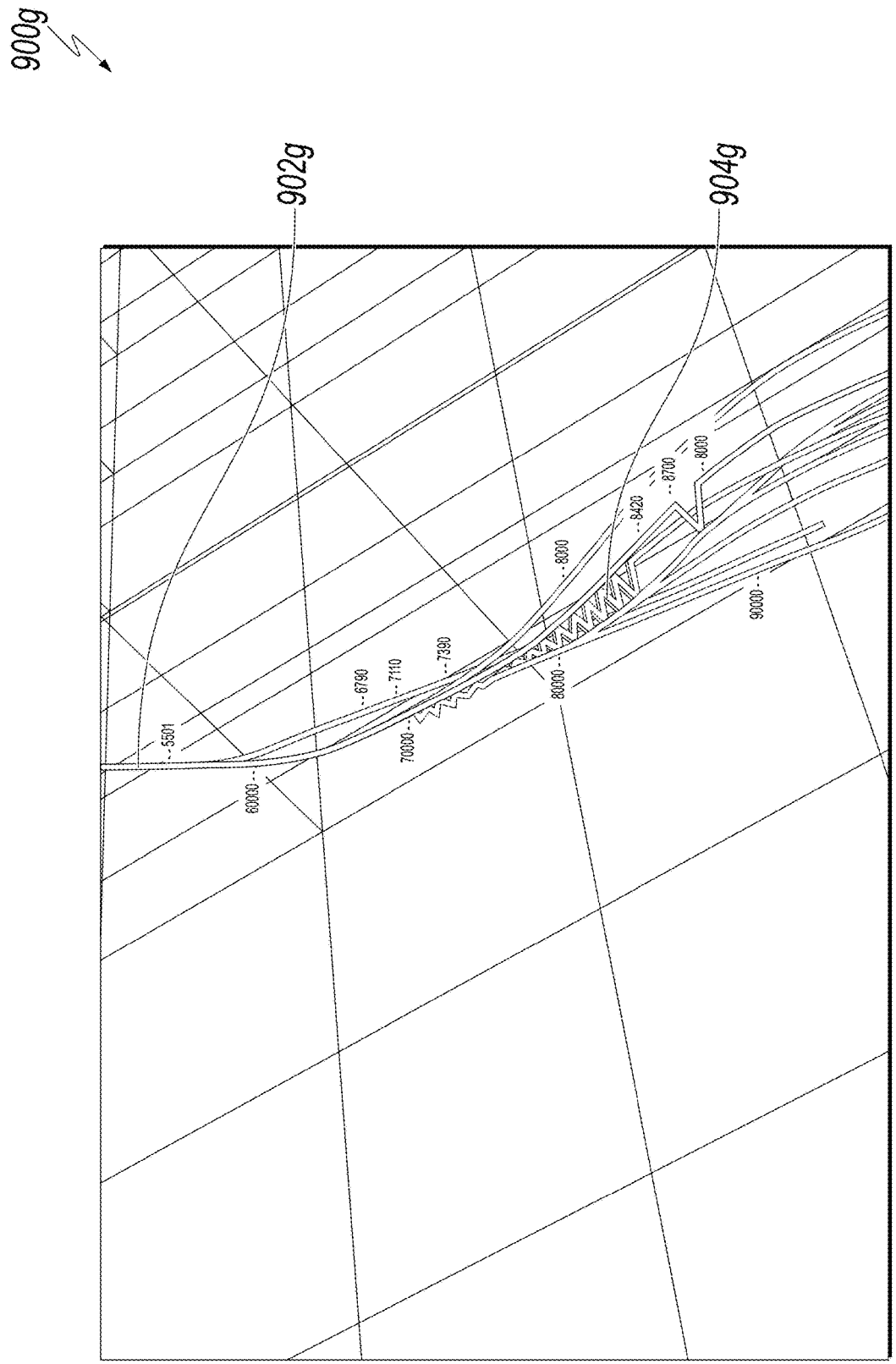
FIG. 9G is a plot illustrating a well trajectory DogLeg Severity value exceeding a threshold value, according to an implementation of the present disclosure.

FIG. 9G is a plot 900g illustrating a well trajectory DogLeg Severity value exceeding a threshold value (for example, 50), according to an implementation of the present disclosure. Note that well path 902g also contains a zig-zag path (for example, at 904g). As illustrated in FIG. 9D (apart from the zig-zag path), the well path 902g (and laterals) appears to have a perfectly reasonable well trajectory. However, when trajectory data is analyzed, well path 902g actually contains a high DogLeg Severity rate.

FIG. 9H is a screenshot of a report 900h illustrating the well trajectory of FIG. 9G containing DogLeg Severity values exceeding a threshold value (for example, 50), according to an implementation of the present disclosure. As illustrated, report 900h contains two DogLeg Severity values (902h and 904h) that exceed the DogLeg Severity threshold value of 50. However, in this case, the high DogLeg Severity rates at 902h and 904h cannot be determined with Constraint 7. However on inspection of report 900h, it is apparent that the cause of this is the sharp bends that exist along the trajectory of the well (as seen in the zig-zag path in FIG. 9G at 904g). The values "434.05" in FIG. 9H (902h and 904h) are related to two different wells.

Based on at least the examples provided with respect to Constraint 7, detecting an anomalously high DogLeg Severity can cover the following purposes:

Detecting missing trajectory points (reported as "possible missing trajectory data points"),
Inclusion of incorrect data points (reported as "possible inclusion of incorrect data points"), and
Well path contains a sharp bend (reported as "visualize trajectory for sharp bend").

Constraint 8—Well Log Values are Found Along Well Trajectory

Well logs including Logging-While-Drilling (LWD), Measurement-While-Drilling (MWD), and Wireline are captured along the trajectory of a well path. The data capture presents another cross-checking opportunity point, in that the well log depth must be along the well trajectory. In some cases, the well logs could be shorter than the actual well trajectory and this will not be picked up by this cross checking method. However, well logs which have a Total Depth greater than the deepest point of a well deviation survey will be flagged as potentially incorrect well data. Note that a tolerance depth is also factored into the consideration, allowing well logs to actually exceed a maximum depth of the well trajectory, as long as the well log depth does not exceed the allowed tolerance depth.

FIG. 10 is a screenshot 1000 of a well log for a well deeper than the Total Depth of the well, according to an implementation of the present disclosure. Here, the well log 1002 ("ROP_ED_DM") for a well 1004 ("Well #1") is deeper 1006 (17416 ft) than the Total Depth of the well 1008 (17355 ft). In some implementations, Constraint 8 has a set tolerance depth (for example, 50 ft). With well 1004, the difference between the well log depth 1006 and the Total Depth of the well 1008 exceeds the tolerance depth. As a result, the described approach can indicate that either the well log is spliced incorrectly or the well Total Depth is incorrect.

Constraint 9—Well Logs Across Well Laterals Start from the Same Surface Location Well laterals kick-off a trajectory from a parent lateral or a main wellbore at a Kick-Off-Point. Based on this fact, the well logs recorded along the trajectory must be exactly the same as the parent lateral up to the Kick-Off-Point. In a typical geoscientific data model, relationships are captured between a parent wellbore and wellbore laterals branching from it. This relationship allows a comparison of well log values to ensure sameness from a reference elevation at the surface to the Kick-Off-Point of the various laterals of the parent wellbore. Well logs of the laterals that do not possess the same well log values will be picked up as having questionable quality. This is symptomatic of, for example, well logs belonging to a wellbore A being loaded into an incorrect wellbore B.

Figure 11B:
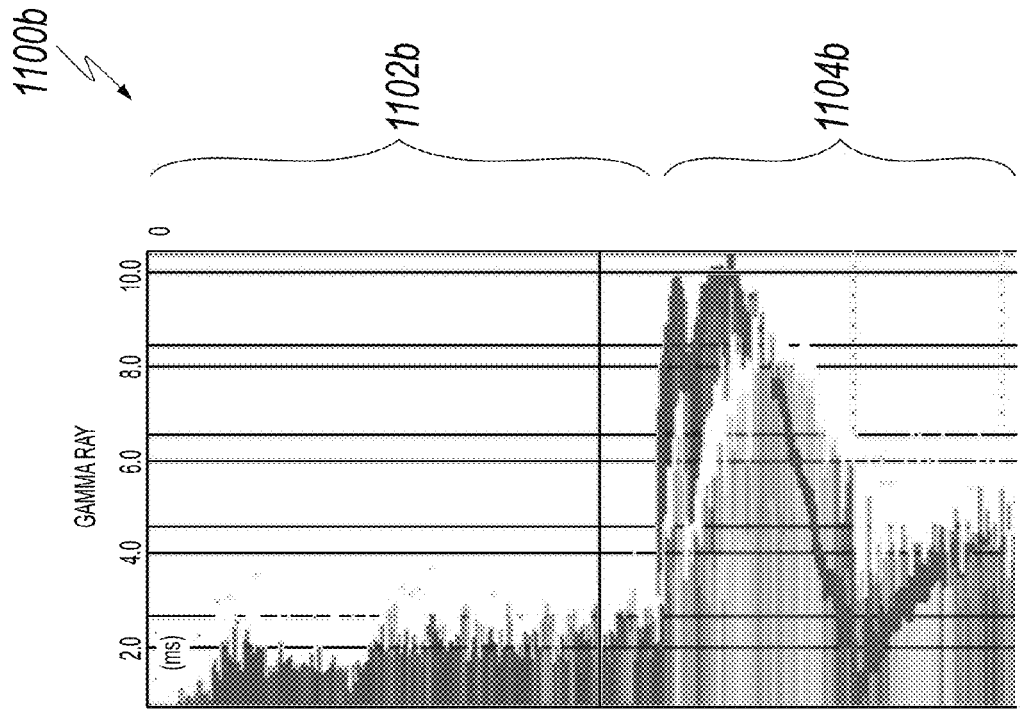
FIG. 11B is a plot illustrating a well log from surface to a Lateral 1 to a Kick-Off-Point of a Lateral 2, according to an implementation of the present disclosure.
Figure 11A:
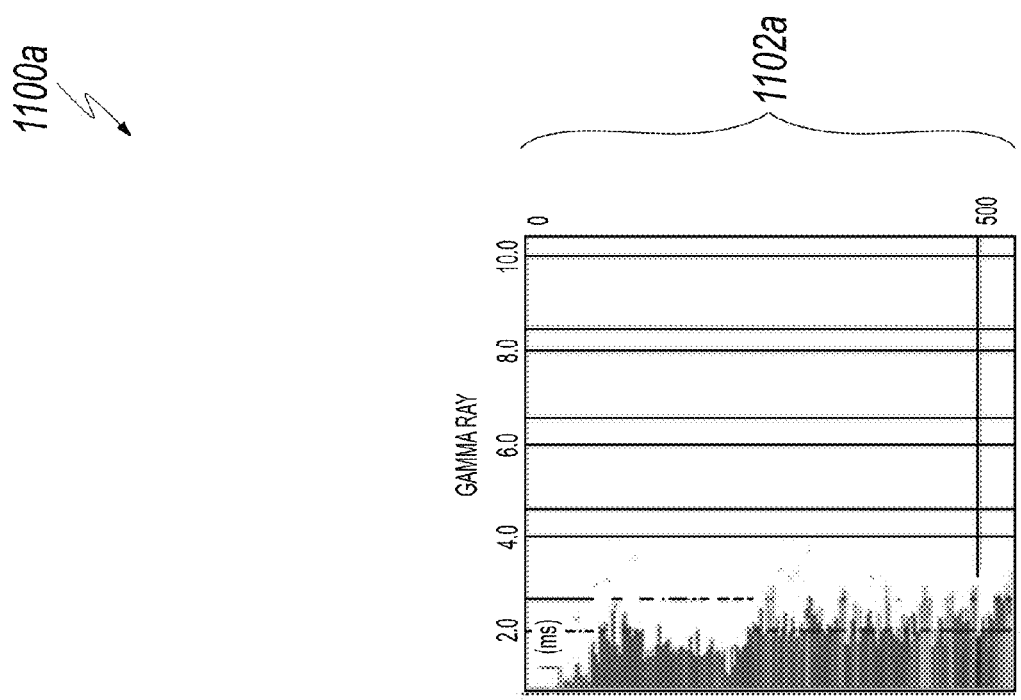
FIG. 11A is a plot illustrating a main wellbore log to a Kick-Off-Point of a Lateral 1, according to an implementation of the present disclosure.

FIG. 11A is a plot 1100a illustrating a main wellbore log to a Kick-Off-Point of a Lateral 1, according to an implementation of the present disclosure. As illustrated, the main wellbore log to Kick-Off-Point of a Lateral 1 1102a is from 0-approximately 500 ft.

FIG. 11B is a plot 1100b illustrating a well log from a surface to a Lateral 1 to a Kick-Off-Point of a Lateral 2, according to an implementation of the present disclosure. As illustrated, the main wellbore log to the Kick-Off-Point of the Lateral 1 1102b is from 0-approx. 500 ft and matches that of 1102a in FIG. 11A. The well log from the surface to the Lateral 1 to the Kick-Off-Point of Lateral 2 1104b runs from approximately 500 ft to approximately 1000 ft.

Figure 11C:
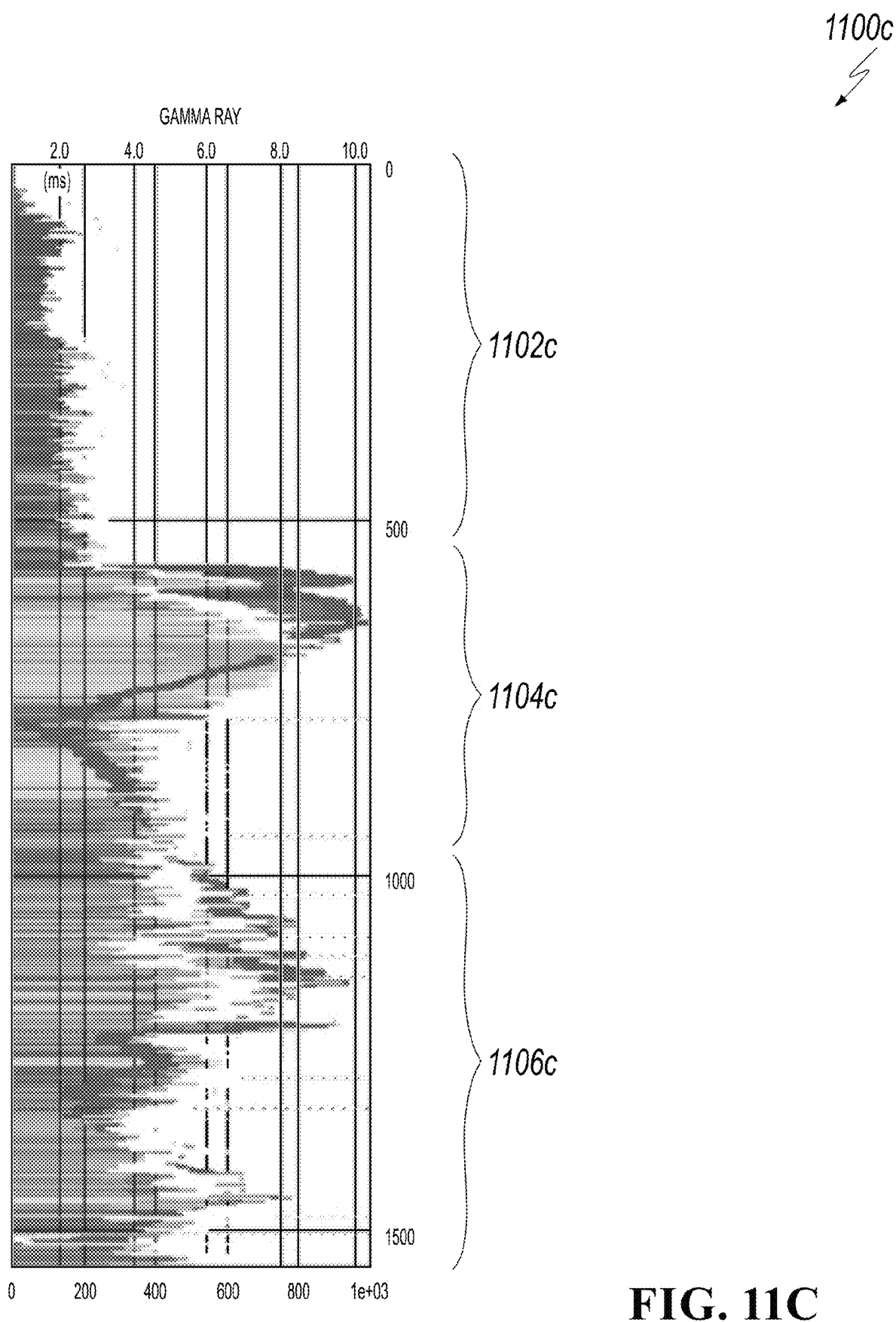
FIG. 11C is a plot illustrating a well log from a surface to a Lateral 2 and to its final Total Depth, according to an implementation of the present disclosure.

FIG. 11C is a plot 1100c illustrating a well log from a surface to a Lateral 2 and to its final Total Depth, according to an implementation of the present disclosure. As illustrated, the main wellbore log to the Kick-Off-Point of the Lateral 1 1102c is from 0-approximately 500 ft and matches that corresponding to 1102a in FIG. 11A. The well log from the surface of the Lateral 1 to the Kick-Off-Point of Lateral 2 1104c runs from approximately 500 ft to approximately 1000 ft and matches that corresponding to 1104b or FIG. 11B. The well log from the surface to the Lateral 2 to its final Total Depth 1106c runs from approximately 1000 ft to 1500 ft. Note that both well log plots 1100b and 1100c possess the same well log plots of well log plots 1100a and 1100b, respectively. Constraint 9 would be satisfied.

Constraint 10—Well Reference Elevation Check

To map a subsurface, it is important that all well reference elevations are elevation heights from the same datum (for example, mean sea level). This is important, because without a common starting point, a resultant sub-surface map will be inaccurate. A Reference Elevation of a well can be expressed as Equation (6):

$$\text{Reference Elevation} = \text{Well location Ground Elevation} + \text{Rig Height} \quad (6).$$

A well that does not satisfy Equation (6) will be highlighted for further verification and correction.

Constraint 11—Detection of Wells Sharing the Same Well Location Coordinates

Constraint 11 follows the principle that a similar well location defined in the database cannot share the same X and Y coordinate location (x, y). The Constraint utilizes the statistical concept of frequency of occurrences of well locations which share the same coordinate location, as in Equation (7):

$$\text{Frequency}(x,y) > 2 \qquad (7).$$

If there are any more than two wells sharing the same location, then these wells will be detected and identified.

Constraint 12—Detection of Well Proximity Radius <25 m

Constraint 12 questions the validity of well locations which are found to be in close proximity. In typical implementations, close proximity is defined as a radius of 25 m. In typical implementations, the radius is configured to be changeable. The steps of an algorithm for Constraint 12 can be defined as:

Identify all well locations (excluding offshore well locations) for scanning,
Sort the X coordinate ascendingly as a first order sort,
Sort the Y coordinate ascendingly as a second order sort,
Iterate all wells in the sorted set, and for each well iterated:
  Find a difference between the X and Y coordinate location (x, y) of a current well with that of the previous well in the sort,
  Find the difference between the X and Y coordinate (x, y) of the current well iterated with that of the next well in the sort, and
  Retain the well locations which have a difference <25 m and find the distance between the locations (for example, using the Pythagoras theorem), and
Report on wells retained.

Constraint 13—Prediction of Incorrect Well Surface Location

The majority of data models record an (X, Y) coordinate location (x, y) of a well and also stores a Universal Transverse Mercator (UTM) zone of the well. A typical validation of a well location coordinate is a check that values of the coordinate location (x, y) are not empty and that a coordinate location (x, y) is within the boundary of its UTM zone. Beyond this validation there is no further assurance as to the accuracy of the entered X and Y coordinate values. In contrast, Constraint 13 uses a scatter plot to reveal outlier values and to predict a well location that has been erroneously entered into the database.

Figure 12A:
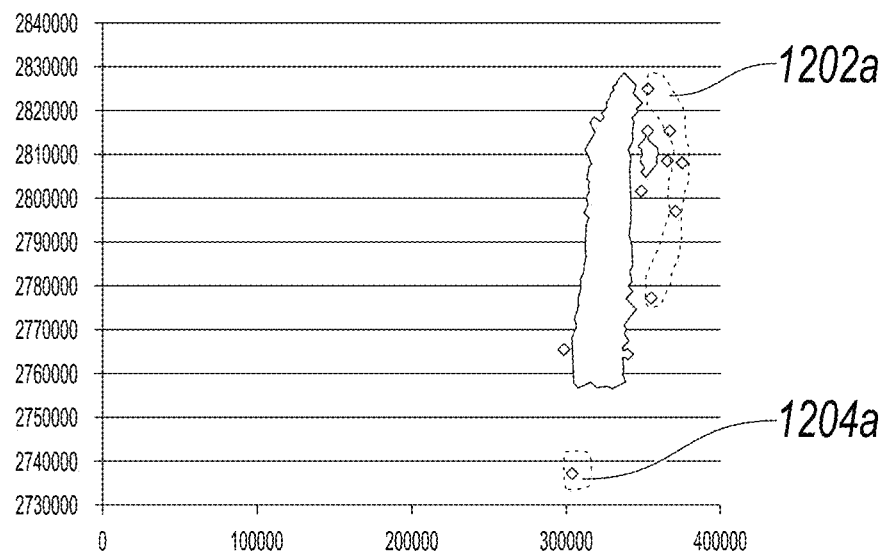
FIG. 12A is a scatterplot of X and Y coordinates of wells within an example major field, according to an implementation of the present disclosure.
Figure 12B:
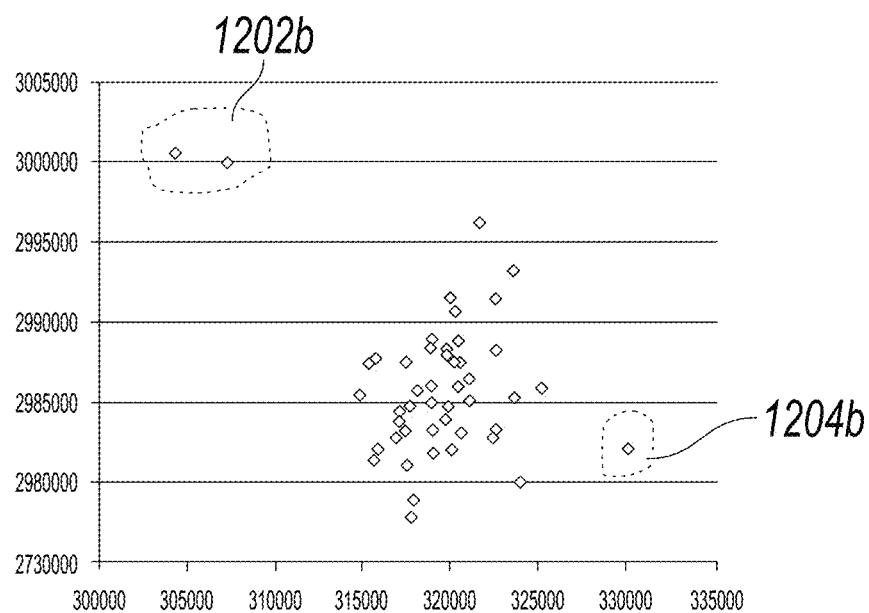
FIG. 12B is a scatterplot of X and Y coordinates of wells within an example minor field, according to an implementation of the present disclosure.

FIG. 12A is a scatterplot 1200a of X and Y coordinates of wells within an example major field, according to an implementation of the present disclosure. Highlighted outlier values (for example, 1202a and 1204a) are indicative of incorrect well coordinates. Similarly, FIG. 12B is a scatterplot 1200b of X and Y coordinates of wells within an example minor field, according to an implementation of the present disclosure. Highlighted outlier values (for example, 1202b and 1204b) are indicative of incorrect well coordinates. Analyzing FIGS. 12A and 12B, it is easy to predict possible incorrect well location coordinates and to focus quality control efforts on outlier wells.

The extent of a field boundary made up of a series of points forming a closed polygon is defined as having two points, namely a minimum bounding coordinate and a maximum bounding coordinate. A minimum bounding coordinate is made up of $X_{minimum}$ and $Y_{minimum}$. For a maximum bounding coordinate, simply substitute the subscript with maximum.

If a field boundary is defined, two constraints can be considered:
1. The X and Y coordinate values of the well in the field must fall within the extent of the field boundary, and
2. The scatterplot of the X and Y coordinates that make-up the field boundary polygon must coincide with the scatterplot of the wells. To validate a defined field boundary, the scattered X and Y coordinates of all valid wells should be located within the field boundary. If a well is located outside of the field boundary, it is an indicator of a wrong well location with respect to that specific well.

Constraint 14—Accurate Tying Between a Wellbore and a Lateral

Typically, well laterals are tied to a parent wellbore from a Kick-Off-Point. The Kick-Off-Point is usually identified by depth. If the tying point between a well lateral and the parent wellbore was not entered correctly in the database, associated data (such as, logs and picks) will be also incorrect. One way to detect inaccurate tying between lateral wellbores and a parent wellbore is to map a surface grid using a key surface, which is interpreted across the field, and then to run a back interpolation report that represents an offset (which can be positive or negative) between the surface grid and the pick. If the offset is positive in the parent wellbore and negative in the lateral wellbore, it is a direct indicator of a miss tie between a parent wellbore and the wellbore lateral. This is also true if the offset is positive in the wellbore lateral and negative in the parent wellbore. At the end, the wellbore lateral is tied with the parent wellbore at an incorrect depth.

Figure 13A:
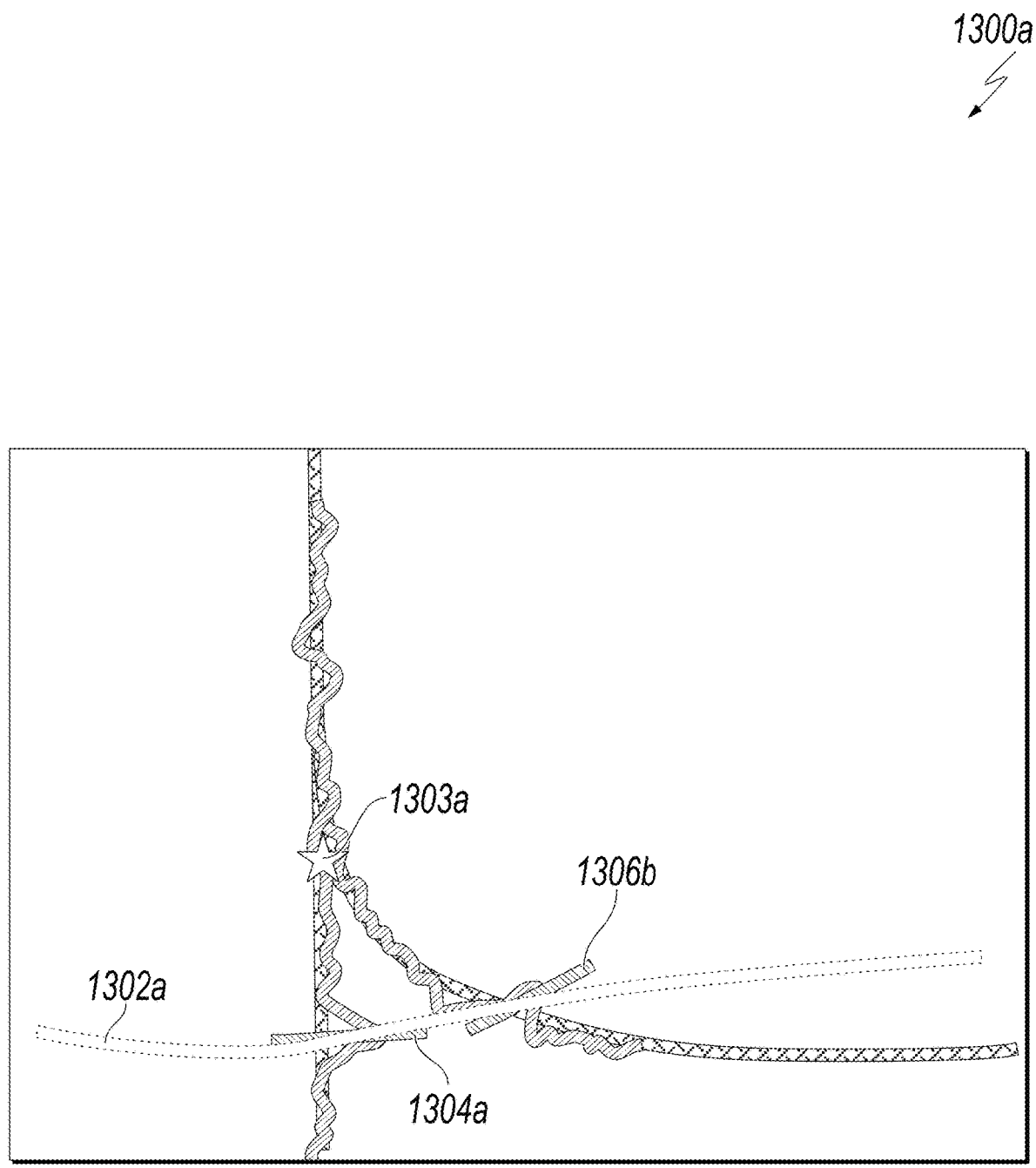
FIG. 13A is a plot illustrating accurate tying between a parent wellbore and a lateral wellbore, according to an implementation of the present disclosure.

FIG. 13A is a plot 1300a illustrating accurate tying between a parent wellbore and a lateral wellbore, according to an implementation of the present disclosure. Here the grid 1302a (a map of an interpreted surface) can cover two surface picks 1304a and 1306a. In FIG. 13A, a tying point between the parent wellbore and the lateral wellbore, marked with star 1303a, is equal to the actual value.

Figure 13B:
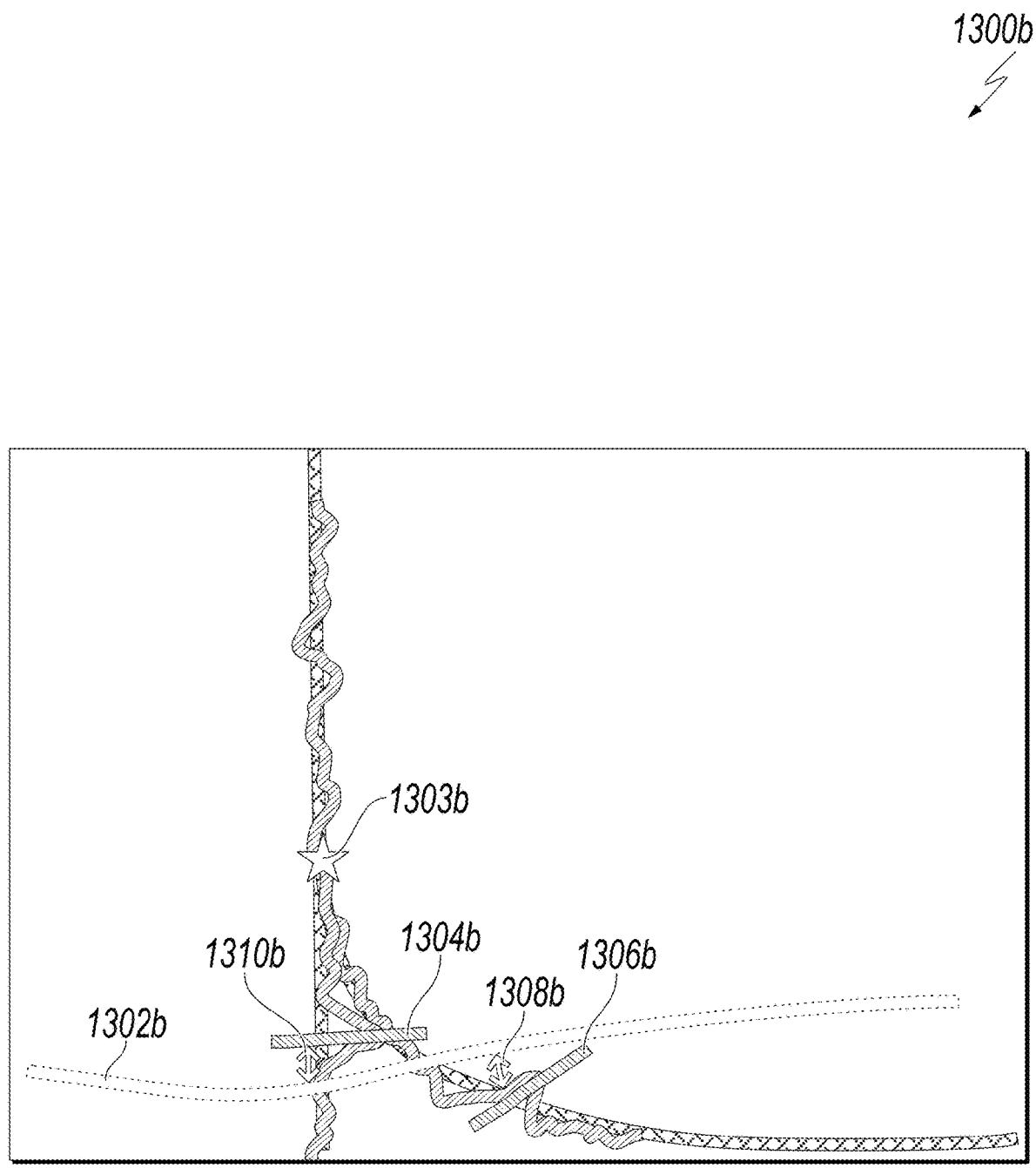
FIG. 13B is a plot illustrating an inaccurate tying between a parent wellbore and a lateral wellbore, according to an implementation of the present disclosure.

FIG. 13B is a plot 1300b illustrating an inaccurate tying between a parent wellbore and a lateral wellbore, according to an implementation of the present disclosure. A tying point between the parent wellbore and the lateral wellbore, marked with star 1303b, is deeper than the actual value. Here the grid 1302b (a map of an interpreted surface) cannot cover the two surface picks 1304b and 1306b because the lateral wellbore tying point 1308b is deeper than the actual wellbore tying point 1310b (an offset is detected between the surface grid 1302b and the surface picks 1304b and 1306b). The well pick is interpreted correctly, however its depth is miscalculated due to the incorrect tying point.

Figure 13C:
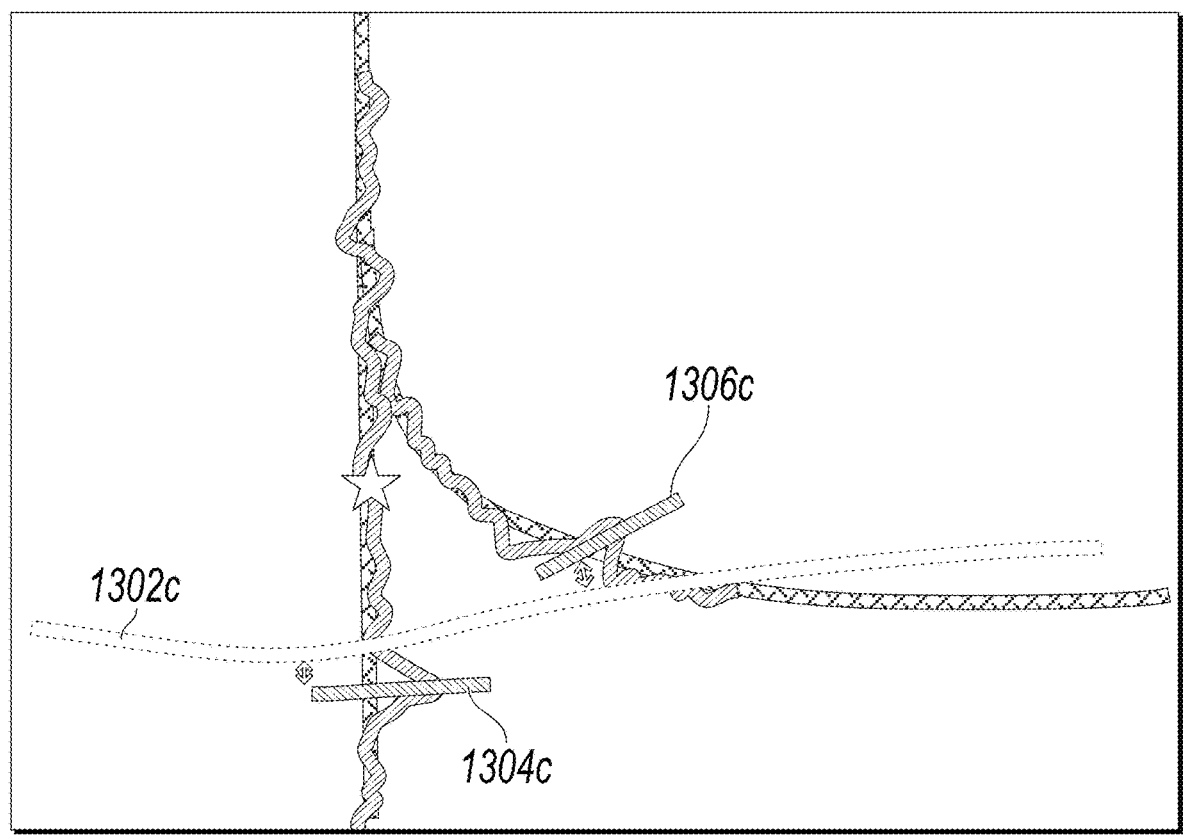
FIG. 13C is a plot illustrating inaccurate tying between a parent wellbore and a lateral wellbore, according to an implementation of the present disclosure.

FIG. 13C is a plot 1300c illustrating inaccurate tying between a parent wellbore and a lateral wellbore, according to an implementation of the present disclosure. Here the grid 1302c cannot cover the two surface picks 1304c and 1306c because the lateral wellbore tying point 1306c is shallower than the actual wellbore tying point 1304c (an offset is detected between the surface grid and the picks). The well pick is interpreted correctly, however its depth is miscalculated due to the incorrect tying point.

FIG. 14A is a screenshot 1400a of a report generated following application of some of the described Constraints to all well data (all fields), according to an implementation of the present disclosure. FIG. 14B is a screenshot 1400b of a report generated following application of some of the described Constraints to all well data in a field, according to an implementation of the present disclosure. FIG. 14C is a screenshot 1400c of a report generated following application of some of the described Constraints to data for one well, according to an implementation of the present disclosure. After the completion of a detection run, the described approach generates a quality score for each Constraint and a mean quality score as illustrated in FIGS. 14A-14C. The mean quality score of a detection run is an average value of the percentage of wellbores passing Constraints. As reservoir data is remedied, subsequent runs should achieve higher total scores. In some implementations, the generated values and associated details can be presented in a web-type page for review.

Figure 15:
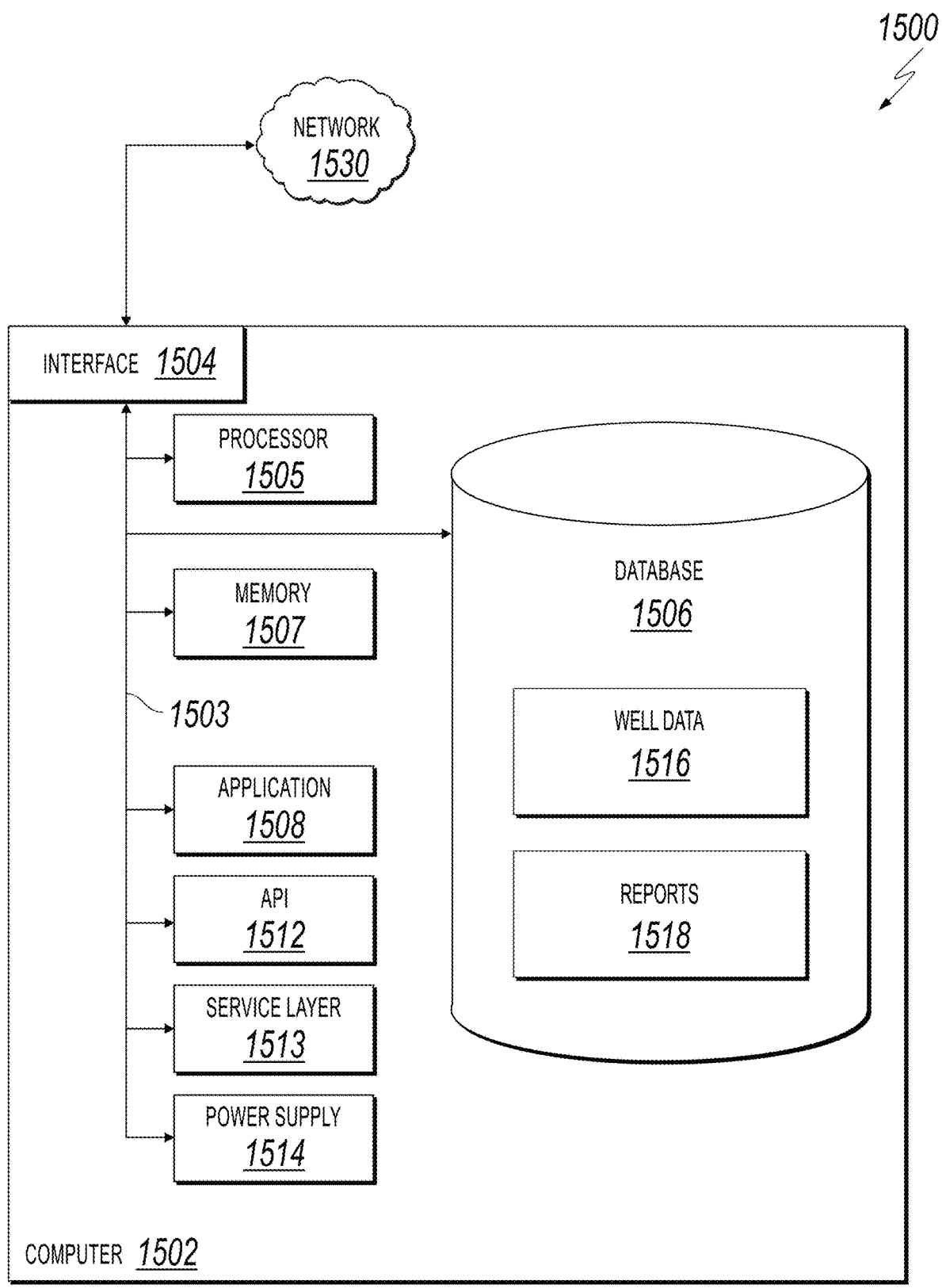
FIG. 15 is a block diagram illustrating an example of a computer-implemented system used to provide computational functionalities associated with described algorithms, methods, functions, processes, flows, and procedures, according to an implementation of the present disclosure.

FIG. 15 is a block diagram illustrating an example of a computer-implemented System 1500 used to provide computational functionalities associated with described algorithms, methods, functions, processes, flows, and procedures, according to an implementation of the present disclosure. In the illustrated implementation, System 1500 includes a Computer 1502 and a Network 1530.

The illustrated Computer 1502 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 1502 can include an input device, such as a keypad, keyboard, touch screen, another input device, or a combination of input devices that can accept user information, and an output device that conveys information associated with the operation of the Computer 1502, including digital data, visual, audio, another type of information, or a combination of types of information, on a graphical-type user interface (UI) (or GUI) or other UI. For example, in some implementations, the illustrated data (such as, in FIGS. 2A-2B, 3A-3B, 6-7, 8A-8B, 9A-9H, 10, 11A-11C, 12A-12B, 13A-13C, and 14A-14C) presented in a GUI or other GUIs (whether illustrated or not) can be interactive in nature and be configured to permit user actions to be performed (such as, triggering messages or requests for data to change, modify, or enhance the illustrated data or to perform actions based on the illustrated data).

The Computer 1502 can serve in a role in a distributed computing system as a client, network component, a server, a database or another persistency, another role, or a combination of roles for performing the subject matter described in the present disclosure. The illustrated Computer 1502 is communicably coupled with a Network 1530. In some implementations, one or more components of the Computer 1502 can be configured to operate within an environment, including cloud-computing-based, local, global, another environment, or a combination of environments.

At a high level, the Computer 1502 is an electronic computing device operable to receive, transmit, process, store, or manage data and information associated with the described subject matter. According to some implementations, the Computer 1502 can also include or be communicably coupled with a server, including an application server, e-mail server, web server, caching server, streaming data server, another server, or a combination of servers.

The Computer 1502 can receive requests over Network 1530 (for example, from a client software application executing on another Computer 1502) and respond to the received requests by processing the received requests using a software application or a combination of software applications. In addition, requests can also be sent to the Computer 1502 from internal users (for example, from a command console or by another internal access method), external or third-parties, or other entities, individuals, systems, or computers.

Each of the components of the Computer 1502 can communicate using a System Bus 1503. In some implementations, any or all of the components of the Computer 1502, including hardware, software, or a combination of hardware and software, can interface over the System Bus 1503 using an application programming interface (API) 1512, a Service Layer 1513, or a combination of the API 1512 and Service Layer 1513. The API 1512 can include specifications for routines, data structures, and object classes. The API 1512 can be either computer-language independent or dependent and refer to a complete interface, a single function, or even a set of APIs. The Service Layer 1513 provides software services to the Computer 1502 or other components (whether illustrated or not) that are communicably coupled to the Computer 1502. The functionality of the Computer 1502 can be accessible for all service consumers using the Service Layer 1513. Software services, such as those provided by the Service Layer 1513, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 1502, alternative implementations can illustrate the API 1512 or the Service Layer 1513 as stand-alone components in relation to other components of the Computer 1502 or other components (whether illustrated or not) that are communicably coupled to the Computer 1502. Moreover, any or all parts of the API 1512 or the Service Layer 1513 can be implemented as a child or a sub-module of another software module, enterprise application, or hardware module without departing from the scope of the present disclosure.

The Computer 1502 includes an Interface 1504. Although illustrated as a single Interface 1504, two or more Interfaces 1504 can be used according to particular needs, desires, or particular implementations of the Computer 1502. The Interface 1504 is used by the Computer 1502 for communicating with another computing system (whether illustrated or not) that is communicatively linked to the Network 1530 in a distributed environment. Generally, the Interface 1504 is operable to communicate with the Network 1530 and includes logic encoded in software, hardware, or a combination of software and hardware. More specifically, the Interface 1504 can include software supporting one or more communication protocols associated with communications such that the Network 1530 or hardware of Interface 1504 is operable to communicate physical signals within and outside of the illustrated Computer 1502.

The Computer 1502 includes a Processor 1505. Although illustrated as a single Processor 1505, two or more Processors 1505 can be used according to particular needs, desires, or particular implementations of the Computer 1502. Generally, the Processor 1505 executes instructions and manipulates data to perform the operations of the Computer 1502 and any algorithms, methods, functions, processes, flows, and procedures as described in the present disclosure.

The Computer 1502 also includes a Database 1506 that can hold data for the Computer 1502, another component communicatively linked to the Network 1530 (whether illustrated or not), or a combination of the Computer 1502 and another component. For example, Database 1506 can be an in-memory, conventional, or another type of database storing data consistent with the present disclosure. In some implementations, Database 1506 can be a combination of two or more different database types (for example, a hybrid in-memory and conventional database) according to particular needs, desires, or particular implementations of the Computer 1502 and the described functionality. Although illustrated as a single Database 1506, two or more databases of similar or differing types can be used according to particular needs, desires, or particular implementations of the Computer 1502 and the described functionality. While Database 1506 is illustrated as an integral component of the Computer 1502, in alternative implementations, Database 1506 can be external to the Computer 1502. As illustrated, the database 1506 holds previously described Well data 1516 and Reports 1518.

The Computer 1502 also includes a Memory 1507 that can hold data for the Computer 1502, another component or components communicatively linked to the Network 1530 (whether illustrated or not), or a combination of the Computer 1502 and another component. Memory 1507 can store any data consistent with the present disclosure. In some implementations, Memory 1507 can be a combination of two or more different types of memory (for example, a combination of semiconductor and magnetic storage) according to particular needs, desires, or particular implementations of the Computer 1502 and the described functionality. Although illustrated as a single Memory 1507, two or more Memories 1507 or similar or differing types can be used according to particular needs, desires, or particular implementations of the Computer 1502 and the described functionality. While Memory 1507 is illustrated as an integral component of the Computer 1502, in alternative implementations, Memory 1507 can be external to the Computer 1502.

The Application 1508 is an algorithmic software engine providing functionality according to particular needs, desires, or particular implementations of the Computer 1502, particularly with respect to functionality described in the present disclosure. For example, Application 1508 can serve as one or more components, modules, or applications. Further, although illustrated as a single Application 1508, the Application 1508 can be implemented as multiple Applications 1508 on the Computer 1502. In addition, although illustrated as integral to the Computer 1502, in alternative implementations, the Application 1508 can be external to the Computer 1502.

The Computer 1502 can also include a Power Supply 1514. The Power Supply 1514 can include a rechargeable or non-rechargeable battery that can be configured to be either user- or non-user-replaceable. In some implementations, the Power Supply 1514 can include power-conversion or management circuits (including recharging, standby, or another power management functionality). In some implementations, the Power Supply 1514 can include a power plug to allow the Computer 1502 to be plugged into a wall socket or another power source to, for example, power the Computer 1502 or recharge a rechargeable battery.

There can be any number of Computers 1502 associated with, or external to, a computer system containing Computer 1502, each Computer 1502 communicating over Network 1530. Further, the term "client," "user," or other appropriate terminology can be used interchangeably, as appropriate, without departing from the scope of the present disclosure. Moreover, the present disclosure contemplates that many users can use one Computer 1502, or that one user can use multiple computers 1502.

In some implementations, the computer 1502 can use proprietary data models (for example, SAUDI ARAMCO CORPORATE DATABASE, LANDMARK HALLIBURTON OPENWORKS, and SCHLUMBERGER GEOFRAME). Other implementations, can include open data models (for example, industry standard model PDDM) or a combination of proprietary and open data models.

Visualization of data can be performed by any graphical visualizer consistent with this disclosure. In some implementations, visualization of data can be performed using the SAUDI ARAMCO WELLVIEW tool.

In some implementations, the described methodology can be configured to send messages, instructions, or other communications to a computer-implemented controller, database, or other computer-implemented system to dynamically initiate control of, control, or cause another computer-implemented system to perform a computer-implemented or other function/operation. For example, operations based on data, operations, outputs, or interaction with a GUI can be transmitted to cause operations associated with a computer, database, network, or other computer-based system to perform storage efficiency, data retrieval, or other operations consistent with this disclosure. In another example, interacting with any illustrated GUI can automatically result in one or more instructions transmitted from the GUI to trigger requests for data, storage of data, analysis of data, or other operations consistent with this disclosure.

In some instances, transmitted instructions can result in control, operation, modification, enhancement, or other operations with respect to a tangible, real-world piece of computing or other equipment. For example, the described GUIs can send a request to slow or speed up a computer database, magnetic/optical disk drive, activate/deactivate a computing system, cause a network interface device to become enabled/disabled, throttled, to increase data bandwidth allowed across a network connection, or to sound an audible/visual alarm (such as, a mechanical alarm/light emitting device) as a notification of a result, behavior, determination, or analysis with respect to a computing system(s) associated with the described methodology or interacting with the computing system(s) associated with the described methodology.

In some implementations, the output of the described methodology can be used to dynamically influence, direct, control, influence, or manage tangible, real-world equipment related to hydrocarbon production, analysis, and recovery or for other purposes consistent with this disclosure. For example, data relating to the described long-term planning model or any other data described in this disclosure can be used in other analytical/predictive processes. As another example, the data relating to the described well data 1516, reports 1518, or any other data described in this disclosure can be used to modify a wellbore trajectory, increase/decrease speed of or stop/start a hydrocarbon drill; activate/deactivate an alarm (such as, a visual, auditory, or voice alarm), or to affect one or more refinery or pumping operations (for example, stop, restart, accelerate, or reduce). Other examples can include alerting geo-steering and directional drilling staff when the integrity of well data is suspect (such as, with a visual, auditory, or voice alarm). In some implementations, the described methodology can be integrated as part of a dynamic computer-implemented control system to control, influence, or use with any hydrocarbon-related or other tangible, real-world equipment explicitly mentioned in, or consistent with, this disclosure.

Described implementations of the subject matter can include one or more features, alone or in combination.

For example, in a first implementation, a computer-implemented method, comprising: retrieving well data from a connected database for data analysis of well data; applying one or more Constraints to the retrieved well data to determine if the retrieved well data includes low-quality or incorrect data; upon determination of the presence of low-quality or incorrect data in the retrieved well data, reporting the determination; analyzing the low-quality or incorrect data for quality control; and remediating the low-quality or incorrect data based on the quality control analysis.

The foregoing and other described implementations can each, optionally, include one or more of the following features:

A first feature, combinable with any of the following features, wherein the database contains historical well data, including well trajectory and location data, and wherein the well data includes invalid data.

A second feature, combinable with any of the previous or following features, comprising dynamically analyzing new well data when input into the database.

A third feature, combinable with any of the previous or following features, wherein the dynamic analysis comprises storing new well data in a separate, temporary database for application of Constraints prior to storage in the database.

A fourth feature, combinable with any of the previous or following features, wherein the data can be retrieved for all fields, a single field, or for one well.

A fifth feature, combinable with any of the previous or following features, comprising analyzing data in the database on a scheduled basis.

A sixth feature, combinable with any of the previous or following features, comprising re-analyzing data in the database based on newly-added or updated Constraints.

In a second implementation, a non-transitory, computer-readable medium storing one or more instructions executable by a computer system to perform operations comprising: retrieving well data from a connected database for data analysis of well data; applying one or more Constraints to the retrieved well data to determine if the retrieved well data includes low-quality or incorrect data; upon determination of the presence of low-quality or incorrect data in the retrieved well data, reporting the determination; analyzing the low-quality or incorrect data for quality control; and remediating the low-quality or incorrect data based on the quality control analysis.

The foregoing and other described implementations can each, optionally, include one or more of the following features:

A first feature, combinable with any of the following features, wherein the database contains historical well data, including well trajectory and location data, and wherein the well data includes invalid data.

A second feature, combinable with any of the previous or following features, comprising one or more instructions to dynamically analyze new well data when input into the database.

A third feature, combinable with any of the previous or following features, wherein the dynamic analysis comprises storing new well data in a separate, temporary database for application of Constraints prior to storage in the database.

A fourth feature, combinable with any of the previous or following features, wherein the data can be retrieved for all fields, a single field, or for one well.

A fifth feature, combinable with any of the previous or following features, comprising one or more instructions to analyze data in the database on a scheduled basis.

A sixth feature, combinable with any of the previous or following features, comprising one or more instructions to re-analyze data in the database based on newly-added or updated Constraints.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: retrieving well data from a connected database for data analysis of well data; applying one or more Constraints to the retrieved well data to determine if the retrieved well data includes low-quality or incorrect data; upon determination of the presence of low-quality or incorrect data in the retrieved well data, reporting the determination; analyzing the low-quality or incorrect data for quality control; and remediating the low-quality or incorrect data based on the quality control analysis.

The foregoing and other described implementations can each, optionally, include one or more of the following features:

A first feature, combinable with any of the following features, wherein the database contains historical well data, including well trajectory and location data, and wherein the well data includes invalid data.

A second feature, combinable with any of the previous or following features, comprising one or more instructions to dynamically analyze new well data when input into the database.

A third feature, combinable with any of the previous or following features, wherein the dynamic analysis comprises storing new well data in a separate, temporary database for application of Constraints prior to storage in the database.

A fourth feature, combinable with any of the previous or following features, wherein the data can be retrieved for all fields, a single field, or for one well.

A fifth feature, combinable with any of the previous or following features, comprising one or more instructions to analyze data in the database on a scheduled basis.

A sixth feature, combinable with any of the previous or following features, comprising one or more instructions to re-analyze data in the database based on newly-added or updated Constraints.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/–R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    retrieving well data from a connected database for data analysis of well data;
    applying one or more constraints to the retrieved well data to determine if the retrieved well data includes low-quality or incorrect data, including determining that the retrieved well data indicates incorrect locations of one or more wells relative to other wells in a field;
    upon determination of the presence of low-quality or incorrect data in the retrieved well data, reporting the determination;
    analyzing the low-quality or incorrect data for quality control;
    remediating the low-quality or incorrect data based on the quality control analysis, including correcting the low-quality data and removing the incorrect data indicating the incorrect locations of the one or more wells; and detecting, and identifying on the wellbore trajectory, sharp turns in the trajectory and zig-zag paths in the trajectory, including determining that a change in successive inclinations of the trajectory exceeds a pre-determined threshold.

2. The computer-implemented method of claim 1, wherein the database contains historical well data, including well trajectory and location data, and wherein the well data includes invalid data.

3. The computer-implemented method of claim 1, comprising dynamically analyzing new well data when input into the database.

4. The computer-implemented method of claim 3, wherein the dynamic analysis comprises storing new well data in a separate, temporary database for application of constraints prior to storage in the database.

5. The computer-implemented method of claim 1, wherein the data can be retrieved for all fields, a single field, or for one well.

6. The computer-implemented method of claim 1, comprising analyzing data in the database on a scheduled basis.

7. The computer-implemented method of claim 1, comprising re-analyzing data in the database based on newly-added or updated constraints.

8. A non-transitory, computer-readable medium storing one or more instructions executable by a computer system to perform operations comprising:

retrieving well data from a connected database for data analysis of well data;

applying one or more constraints to the retrieved well data to determine if the retrieved well data includes low-quality or incorrect data, including determining that the retrieved well data indicates incorrect locations of one or more wells relative to other wells in a field;

upon determination of the presence of low-quality or incorrect data in the retrieved well data, reporting the determination;

analyzing the low-quality or incorrect data for quality control;

remediating the low-quality or incorrect data based on the quality control analysis, including correcting the low-quality data and removing the incorrect data indicating the incorrect locations of the one or more wells; and detecting, and identifying on the wellbore trajectory, sharp turns in the trajectory and zig-zag paths in the trajectory, including determining that a change in successive inclinations of the trajectory exceeds a pre-determined threshold.

9. The non-transitory, computer-readable medium of claim 8, wherein the database contains historical well data, including well trajectory and location data, and wherein the well data includes invalid data.

10. The non-transitory, computer-readable medium of claim 8, comprising one or more instructions to dynamically analyze new well data when input into the database.

11. The non-transitory, computer-readable medium of claim 10, wherein the dynamic analysis comprises storing new well data in a separate, temporary database for application of constraints prior to storage in the database.

12. The non-transitory, computer-readable medium of claim 8, wherein the data can be retrieved for all fields, a single field, or for one well.

13. The non-transitory, computer-readable medium of claim 8, comprising one or more instructions to analyze data in the database on a scheduled basis.

14. The non-transitory, computer-readable medium of claim 8, comprising one or more instructions to re-analyze data in the database based on newly-added or updated constraints.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

retrieving well data from a connected database for data analysis of well data;

applying one or more constraints to the retrieved well data to determine if the retrieved well data includes low-quality or incorrect data, including determining that the retrieved well data indicates incorrect locations of one or more wells relative to other wells in a field;

upon determination of the presence of low-quality or incorrect data in the retrieved well data, reporting the determination;

analyzing the low-quality or incorrect data for quality control;

remediating the low-quality or incorrect data based on the quality control analysis, including correcting the low-quality data and removing the incorrect data indicating the incorrect locations of the one or more wells; and detecting, and identifying on the wellbore trajectory, sharp turns in the trajectory and zig-zag paths in the trajectory, including determining that a change in successive inclinations of the trajectory exceeds a pre-determined threshold.

16. The computer-implemented system of claim 15, wherein the database contains historical well data, including well trajectory and location data, and wherein the well data includes invalid data.

17. The computer-implemented system of claim 15, comprising one or more instructions to dynamically analyze new well data when input into the database, wherein the dynamic analysis comprises storing new well data in a separate, temporary database for application of constraints prior to storage in the database.

18. The computer-implemented system of claim 15, wherein the data can be retrieved for all fields, a single field, or for one well.

19. The computer-implemented system of claim 15, comprising one or more instructions to analyze data in the database on a scheduled basis.

20. The computer-implemented system of claim 15, comprising one or more instructions to re-analyze data in the database based on newly-added or updated constraints.

* * * * *